(12) United States Patent
Pickett et al.

(10) Patent No.: US 10,225,220 B2
(45) Date of Patent: Mar. 5, 2019

(54) PROVIDING AUGMENTED MESSAGE ELEMENTS IN ELECTRONIC COMMUNICATION THREADS

(71) Applicant: Facebook, Inc., Menlo Park, CA (US)

(72) Inventors: Cameron James Pickett, Redmond, WA (US); Patrick Andrew Larson, Bremerton, WA (US); Russell William Andrews, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 137 days.

(21) Appl. No.: 14/727,452

(22) Filed: Jun. 1, 2015

(65) Prior Publication Data

US 2016/0352667 A1    Dec. 1, 2016

(51) Int. Cl.
*H04L 12/58* (2006.01)
*H04L 29/08* (2006.01)

(52) U.S. Cl.
CPC .............. *H04L 51/16* (2013.01); *H04L 67/22* (2013.01); *H04L 67/306* (2013.01); *H04L 51/063* (2013.01); *H04L 67/20* (2013.01)

(58) Field of Classification Search
CPC ....... H04L 51/16; H04L 51/046; H04L 67/22; H04L 67/306; H04L 67/20
See application file for complete search history.

(56) References Cited

U.S. PATENT DOCUMENTS

| | | | | |
|---|---|---|---|---|
| 5,880,731 A | * | 3/1999 | Liles | G06F 3/0481 345/473 |
| 7,640,304 B1 | * | 12/2009 | Goldscheider | G06Q 10/10 709/204 |
| 7,685,237 B1 | * | 3/2010 | Weaver | G06Q 10/10 709/205 |
| 7,913,176 B1 | * | 3/2011 | Blattner | G06Q 10/107 715/758 |
| 8,402,378 B2 | * | 3/2013 | Blattner | G06T 13/40 715/758 |
| 9,866,795 B2 | * | 1/2018 | Caldwell | H04N 7/157 |
| 2004/0221224 A1 | * | 11/2004 | Blattner | H04L 12/1822 715/201 |
| 2005/0107127 A1 | * | 5/2005 | Moriya | G06F 17/30265 455/566 |
| 2006/0041848 A1 | * | 2/2006 | Lira | G06Q 10/107 715/805 |

(Continued)

FOREIGN PATENT DOCUMENTS

| | | |
|---|---|---|
| WO | WO2015148585 A2 | 9/2004 |
| WO | WO2015148585 A1 | 10/2015 |
| WO | WO2016195666 A1 | 12/2016 |

OTHER PUBLICATIONS

International Search Report & Written Opinion as received in PCT/US2015/033784 dated Feb. 25, 2016.

(Continued)

*Primary Examiner* — Blake J Rubin
(74) *Attorney, Agent, or Firm* — Keller Jolley Preece

(57) ABSTRACT

The present disclosure is directed toward systems and methods for providing message element in electronic communication threads. For example, systems and methods described herein identify message elements in electronic communication threads and add interactions between the message elements to the electronic communication thread.

20 Claims, 12 Drawing Sheets

(56) References Cited

U.S. PATENT DOCUMENTS

| | | | | |
|---|---|---|---|---|
| 2007/0168862 A1* | 7/2007 | Hunt | H05B 37/029 | 715/705 |
| 2007/0168863 A1* | 7/2007 | Blattner | G06F 3/011 | 715/706 |
| 2007/0171192 A1* | 7/2007 | Seo | H04M 1/72544 | 345/156 |
| 2008/0214214 A1* | 9/2008 | Reissmueller | G06F 3/0486 | 455/466 |
| 2008/0215995 A1* | 9/2008 | Wolf | G06T 11/00 | 715/758 |
| 2009/0128567 A1* | 5/2009 | Shuster | G06T 13/40 | 345/473 |
| 2009/0257730 A1 | 10/2009 | Chen et al. | | |
| 2009/0307614 A1 | 12/2009 | Craig et al. | | |
| 2010/0004008 A1* | 1/2010 | Abolrous | H04L 51/063 | 455/466 |
| 2010/0105438 A1* | 4/2010 | Wykes | G06F 3/0482 | 455/566 |
| 2010/0302254 A1* | 12/2010 | Min | G06F 17/214 | 345/473 |
| 2012/0069028 A1* | 3/2012 | Bouguerra | H04L 51/10 | 345/473 |
| 2012/0270578 A1* | 10/2012 | Feghali | H04W 4/14 | 455/466 |
| 2013/0307997 A1 | 11/2013 | O'Keefe | | |
| 2014/0009475 A1* | 1/2014 | Setton | G06T 13/80 | 345/473 |
| 2014/0086508 A1 | 3/2014 | Tang et al. | | |
| 2014/0136990 A1* | 5/2014 | Gonnen | H04L 51/18 | 715/752 |
| 2014/0143682 A1* | 5/2014 | Druck | G06Q 10/107 | 715/752 |
| 2014/0211065 A1 | 7/2014 | Sudheendra et al. | | |
| 2014/0215360 A1* | 7/2014 | Degani | G06F 3/0481 | 715/753 |
| 2014/0237392 A1* | 8/2014 | Hoomani | H04L 51/32 | 715/757 |
| 2014/0289344 A1* | 9/2014 | Calhoun | H04L 51/04 | 709/206 |
| 2014/0372541 A1* | 12/2014 | Feghali | H04L 51/18 | 709/206 |
| 2015/0006657 A1* | 1/2015 | Zhang | H04L 51/08 | 709/206 |
| 2015/0038235 A1 | 2/2015 | Kamekawa | | |
| 2015/0052211 A1* | 2/2015 | Kim | H04L 65/403 | 709/206 |
| 2015/0121251 A1* | 4/2015 | Kadirvel | H04M 1/72544 | 715/753 |
| 2015/0281157 A1* | 10/2015 | Pearce | H04L 51/18 | 709/206 |
| 2015/0324858 A1* | 11/2015 | DeMattei | H04L 51/08 | 705/14.64 |
| 2015/0334075 A1* | 11/2015 | Wang | G07C 13/00 | 715/752 |
| 2015/0350125 A1* | 12/2015 | Henderson | H04L 51/043 | 715/753 |
| 2016/0006679 A1* | 1/2016 | Williams | H04L 51/10 | 455/466 |
| 2016/0014064 A1* | 1/2016 | Harper | H04L 51/046 | 709/206 |
| 2016/0035123 A1* | 2/2016 | Bonansea | G06T 13/80 | 345/473 |
| 2016/0154959 A1* | 6/2016 | Chin | H04L 51/10 | 726/22 |
| 2016/0253552 A1* | 9/2016 | Rihn | G06K 9/00302 | 382/224 |
| 2016/0259526 A1* | 9/2016 | Lee | G06F 3/04817 | |
| 2016/0292903 A1* | 10/2016 | Li | G06T 13/80 | |
| 2016/0344668 A1* | 11/2016 | Young | H04W 4/21 | |
| 2016/0359777 A1* | 12/2016 | Tucker | H04L 51/04 | |
| 2017/0075878 A1* | 3/2017 | Jon | G06F 17/276 | |
| 2017/0131870 A1* | 5/2017 | Harper | G06F 3/04817 | |

OTHER PUBLICATIONS

Extended European Search Report as received in EP 16151185.2 dated Oct. 28, 2016.

\* cited by examiner

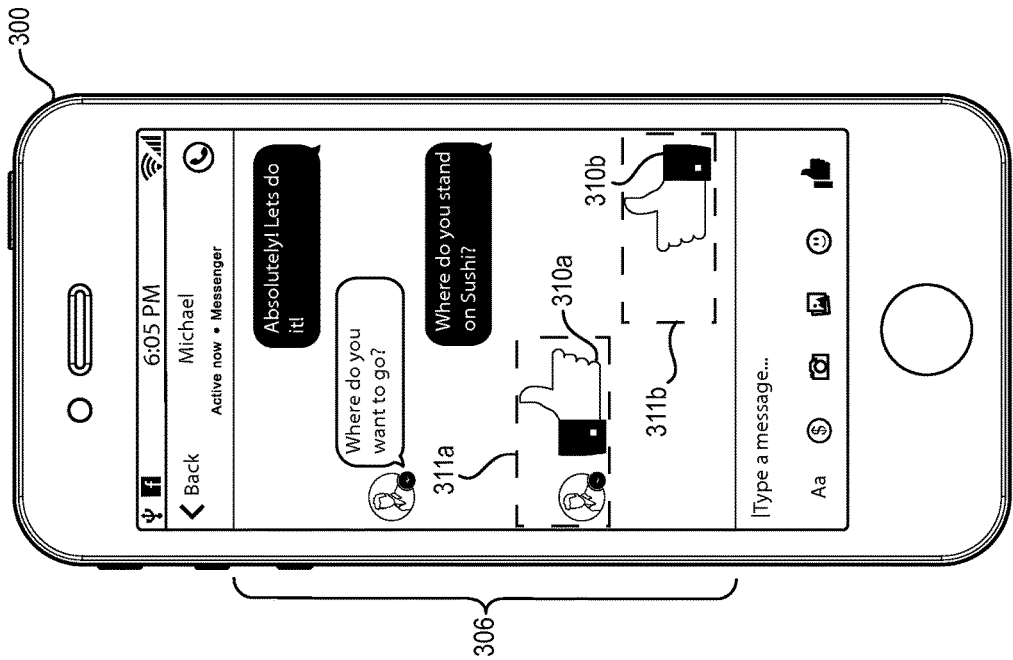
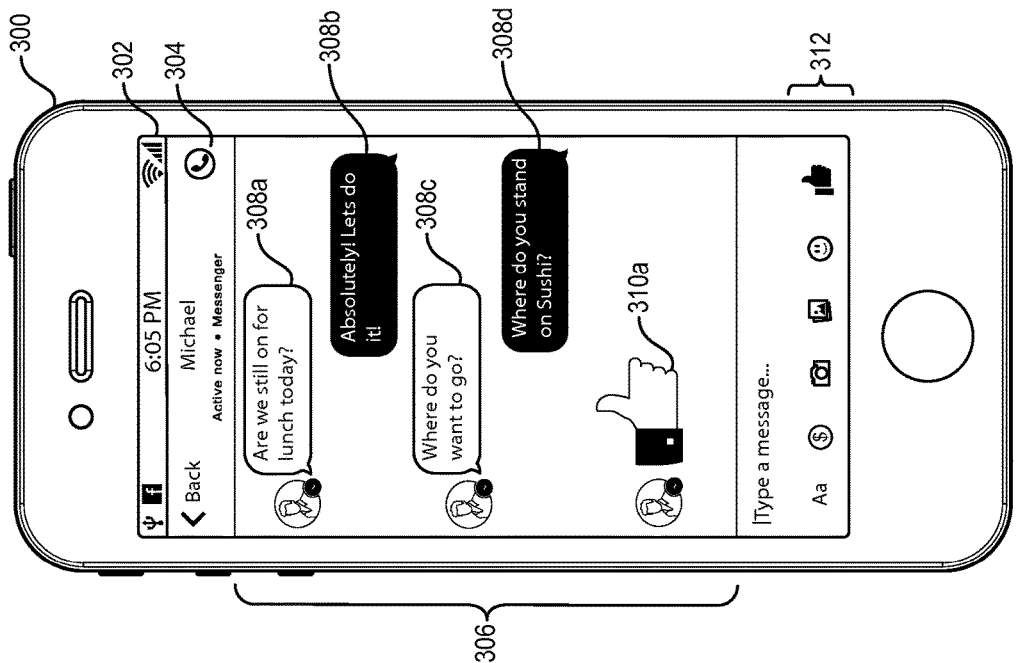
Fig. 3B
Fig. 3A

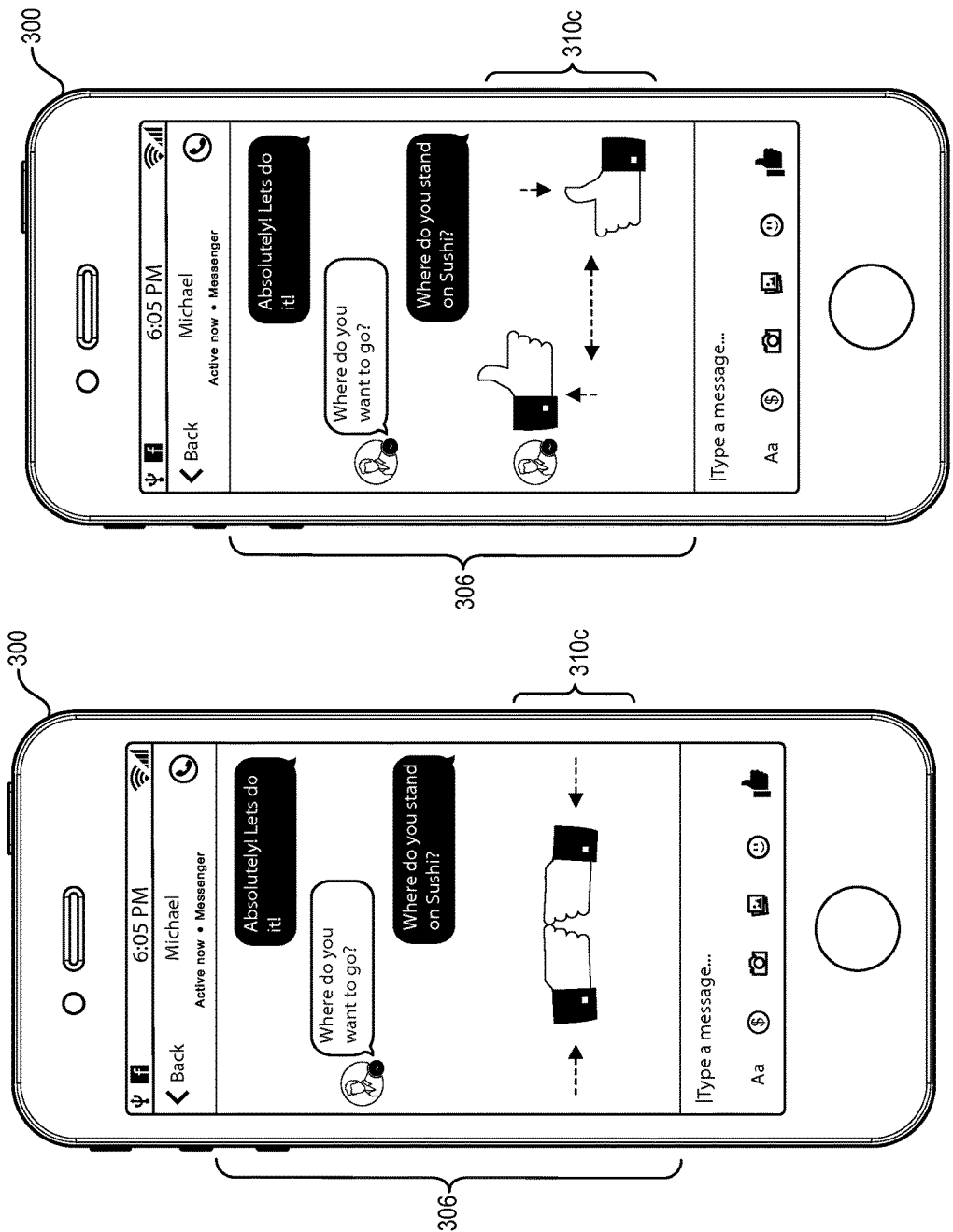

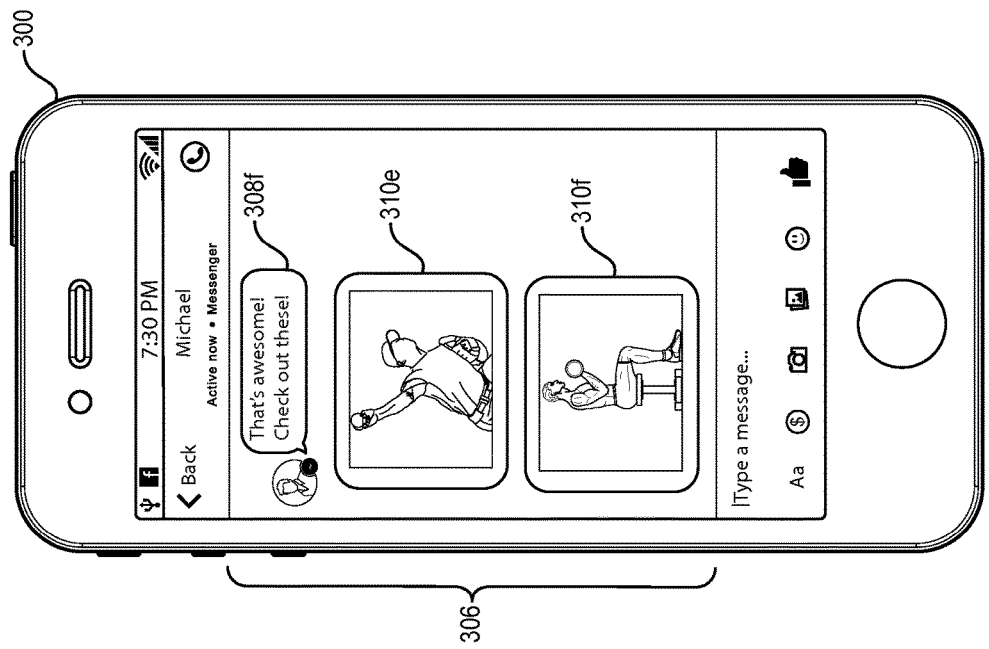
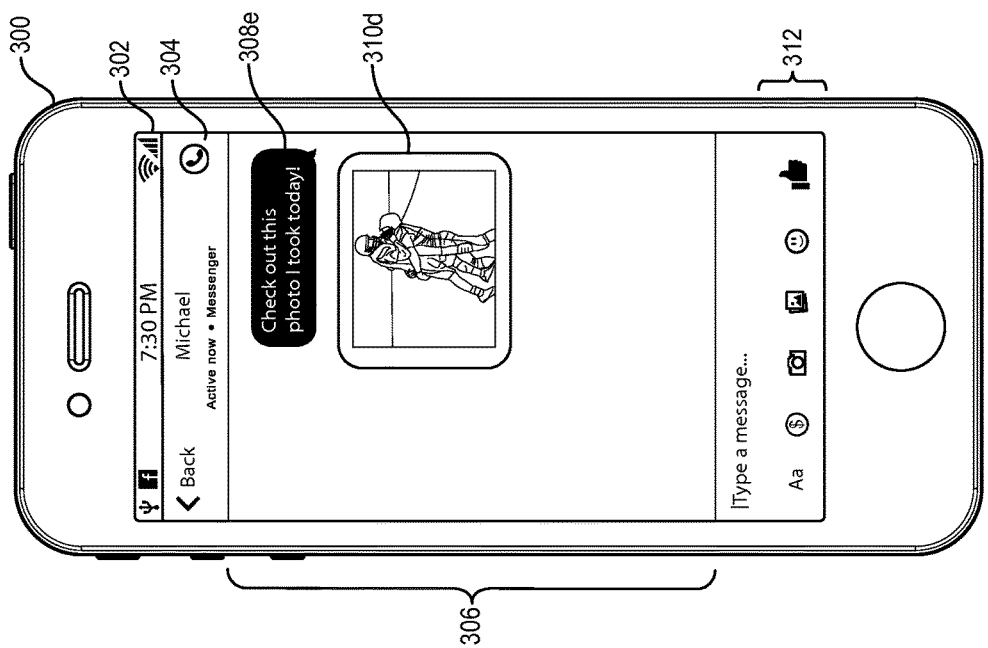
Fig. 4B
Fig. 4A

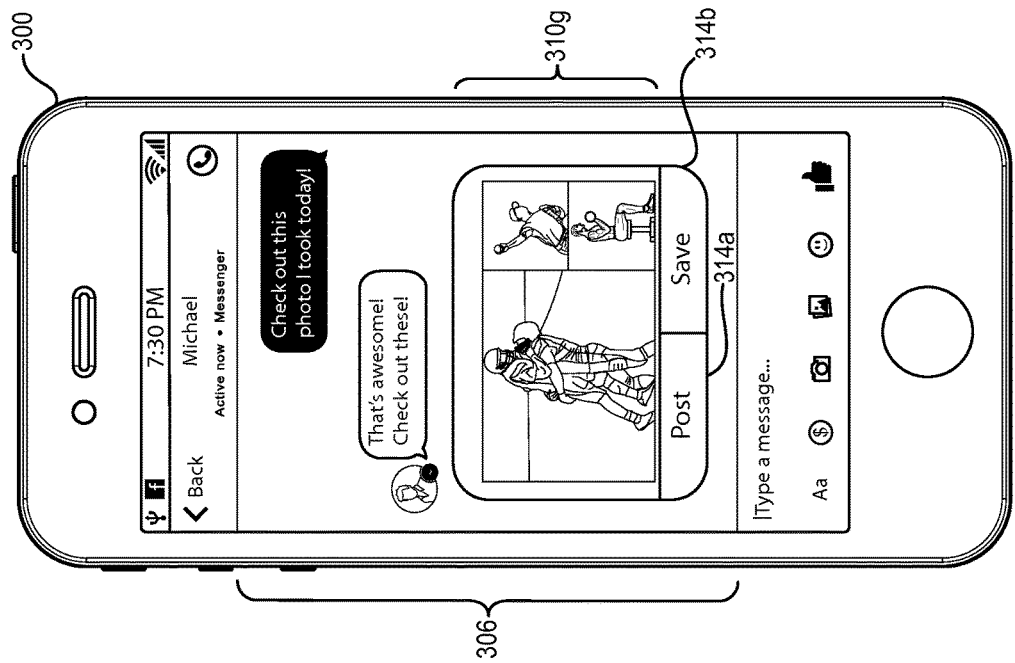
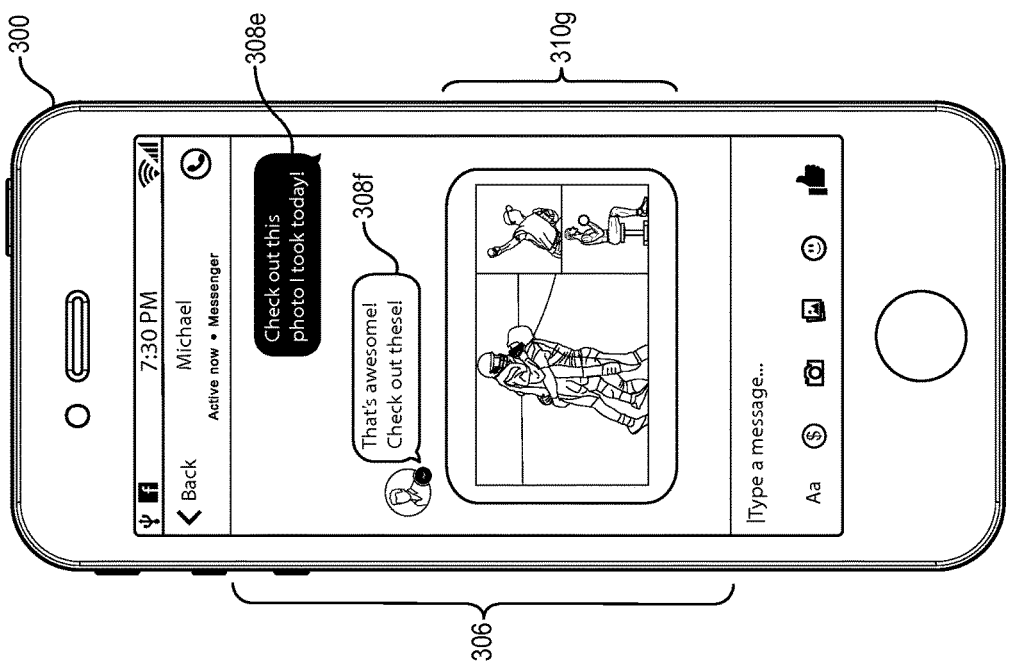

PROVIDING AUGMENTED MESSAGE ELEMENTS IN ELECTRONIC COMMUNICATION THREADS

CROSS REFERENCE TO RELATED APPLICATIONS

N/A

BACKGROUND

1. Technical Field

One or more embodiments of the present disclosure relate generally to electronic communications. More specifically, one or more embodiments of the present disclosure relate to intelligently augmenting message elements in electronic communications.

2. Background and Relevant Art

Computing devices (e.g., computers, tablets, and smart phones) provide numerous ways for people to connect and communicate with one another. For example, a computing device can execute an electronic communication application that provides various methods to send and receive electronic messages. Conventional electronic communication applications generally allow a user to communicate with other users via text messaging, instant messaging, social network posts, and other forms of electronic communication. In addition, an electronic communication may include a variety of content, such as text, images, video, and/or other data. In general, electronic communication has become a popular way in which people connect and communicate with each other.

Due to the wide variety of ways in which people can communicate using electronic communications, as well as the convenience and mobility of electronic devices, users are often faced with receiving and sending a large number of electronic messages on a daily basis. To increase the efficiency of sending and receiving electronic messages, many conventional electronic communication applications allow a user to include emoticons, stickers, images, etc. within an electronic message as a shortcut form of communication. Emoticons, stickers, images, etc. can represent a shortcut form of communication because less user input (e.g., less typing) may be required to include an emoticon in an electronic communication compared to inputting a message conveying the thought provided by the emoticon using conventional text. Thus, including emoticons, stickers, images, etc. in an electronic message may allow a user to reduce the need to type several words, or even sentences.

Emoticons are popular because they allow a user to convey feelings and emotions that are difficult to convey using text. The use of emoticons, stickers, and the like can help allow users to have an electronic conversation that better allows for communication of non-verbal cues. Thus, emoticons, stickers, and the like can help allow users to express themselves in a manner easily conveyed in face-to-face communication but difficult using text alone.

The use of emoticons, stickers, and the like, can increase the efficiency of sending and receiving electronic messages. Nonetheless, there are several disadvantages with respect to the conventional use of emoticons, stickers, and the like. For example, the use of emoticons, stickers, and the like do not allow for interaction and interplay of non-verbal communication that is common in face-to-face conversations. In particular, after a first user sends an emoticon to a second user, the first user has no indication of whether and how the emoticon was received. In other words, the first user generally does not know whether the second user received the emoticon, whether the second user actually saw the emoticon, or whether the second user understood the first user's meaning in sending the emoticon.

Furthermore, the message elements typically used in electronic communications are not robust. For example, a typical emoticon is a static image that an electronic communication application merely adds to a communication thread between two users. In some cases, the emoticon may be in a format that allows for rudimentary animation. But even an animated emoticon is generally limited to a few self-contained frames of repetitive and non-interactive movement. Accordingly, existing methods of using symbols in electronic communications generally fail to add any layer of expression or interaction to electronic communications between two or more users.

Thus, there are several disadvantages to current methods for utilizing symbols in electronic communications.

SUMMARY

One or more embodiments described herein provide benefits and/or solve one or more of the foregoing or other problems in the art with systems and methods for providing augmented message elements in electronic communications. One or more embodiments described herein include systems and methods for detecting corresponding message elements in a communication thread. Upon detecting corresponding message elements, the systems and methods can cause an interaction to appear between the corresponding message elements, replace the corresponding message elements with an alternative message element, or otherwise provide an augmented message element in the communication thread. For example, in one embodiment, the systems and methods described herein can identify a message element submitted by a first user in a communication thread, as well as a corresponding message element submitted by a second user in the communication thread. In response to identifying both message elements, the systems and methods described herein can display an interaction between the message elements within the communication thread. Thus, systems and methods described herein provide a robust and interactive communication feature that adds another layer of expression to the electronic communications.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the disclosure will be described and explained with additional specificity and detail through the use of the accompanying drawings in which:

FIGS. 3A-3F illustrate a series of user interfaces for facilitating display of message elements in an electronic communication thread in accordance with one or more embodiments;

FIGS. 4A-4D illustrate a series of user interfaces for facilitating display of message elements in an electronic communication thread in accordance with one or more embodiments;

DETAILED DESCRIPTION

Figure 1:
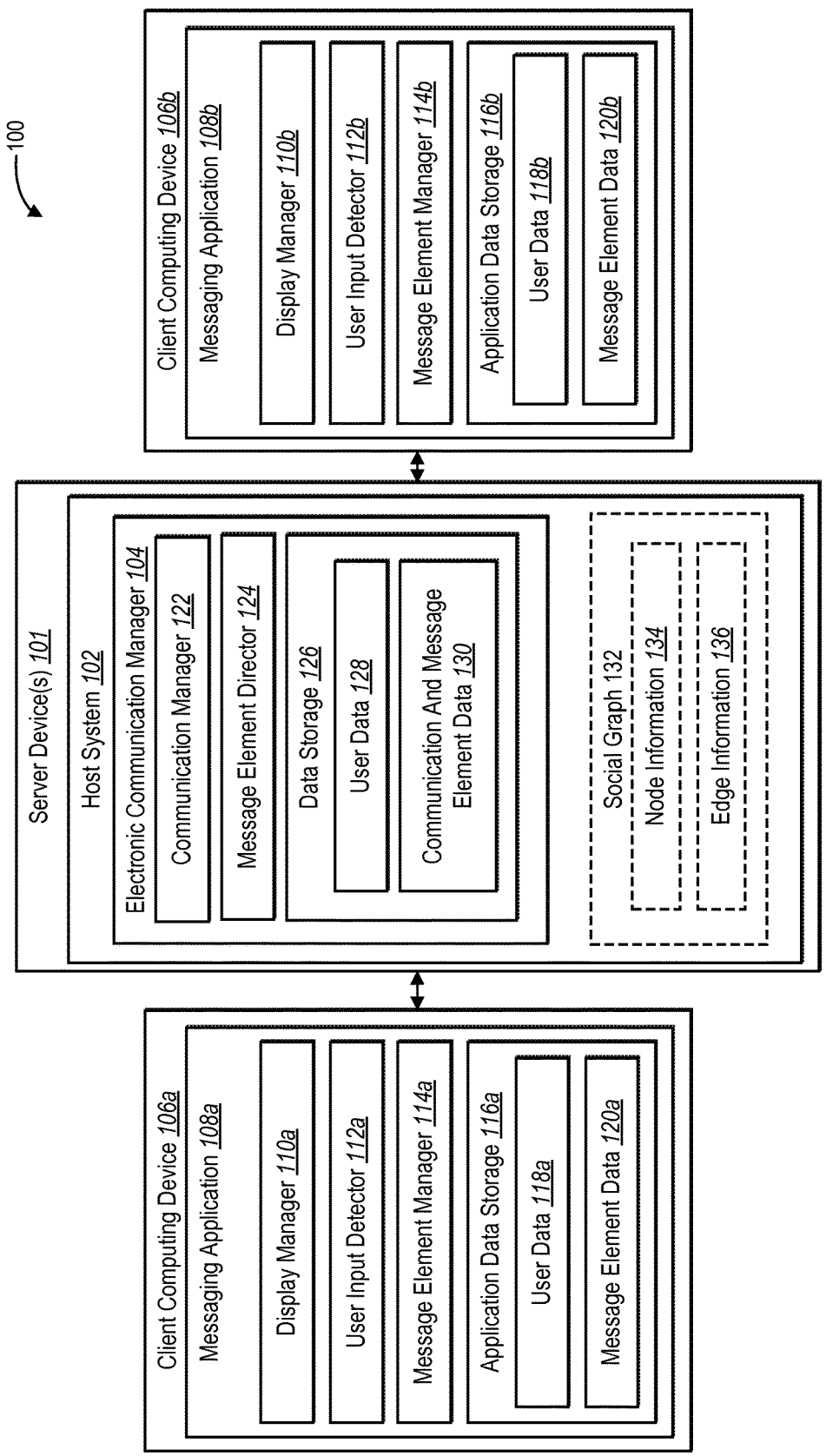
FIG. 1 illustrates a detailed schematic diagram of an electronic communication system in accordance with one or more embodiments.

One or more embodiments described herein include an electronic communication system that utilizes message elements. For example, an electronic communication system of one or more embodiments described herein identifies two or more corresponding message elements sent by participants in a communications thread. The electronic communication system then replaces or modifies the corresponding message elements with an augmented message element.

In one or more embodiments, the electronic communication system can search a communication thread for one or more message elements. If the electronic communication system identifies a first message element sent from one communication participant, the electronic communication system can search the communication thread for a second corresponding message element sent from a different communication participant. The electronic communication system can replace corresponding message elements in a communication thread with an augmented message element. In at least one embodiment, the augmented message element can display an interaction between the identified corresponding message elements that the electronic communication system has replaced.

The electronic communication system can associate pairs or a plurality of message elements to create corresponding message elements. In particular, the electronic communication system can associate related message elements. For example, the electronic communication system can associate two thumbs-up stickers. The electronic communication system can then associate one or more additional or alternative message elements with each set of corresponding message elements. For instance, referring to the previous example, the electronic messaging system can associate a first bump animation with the two thumbs-up stickers. As such, when a second user sends a thumbs-up sticker in response to a thumbs-up sticker sent by a first user, the electronic communication system can replace the two thumbs-up stickers with the first bump animation. Thus, the electronic communication system can allow users to add another layer of expression and communication to the exchange of electronic communications.

The electronic communication system can replace corresponding message elements in a communication thread in response to one or more triggers. For example, in one embodiment, when the electronic communication system determines that the corresponding message elements were sent within a threshold period of time, the electronic communication system can replace the corresponding message elements with an augmented message element. Alternatively, the electronic communications system can replace the corresponding message elements with an augmented message element upon determining that corresponding message elements were sent consecutively or consecutively within a threshold period of time. In still further embodiments, a user can provide input that triggers the replacement of corresponding message elements.

As used herein, an electronic message element (or simply "message element") refers to any part of an electronic communication that expresses a user message, sentiment, tone, temperament, or thought. In one or more embodiments, message elements do not consist of conventional text. For example, a message element can comprise one or more stickers, symbols, icons, emoticons, images, illustrations, animations, sounds, video clips, audio clips, other content that can be sent via an electronic communication, or combinations thereof. For instance, a message element may include a symbol. In another instance, however, a single message element may comprise an icon, animation, or sound. In addition, in one or more embodiments, although a message element does not consist of conventional text, an electronic communication can comprise conventional written language (e.g., an instant message may contain the message: "Have a good day! ☺"). Alternatively, an electronic communication can comprise only a message element (e.g., an instant message can contain the message: " ☺ "). Multiple message elements, as well as different types of message elements, can be included in a single electronic communication. Still further, in one or more embodiments, message element can consist of conventional text.

Message elements can comprise both system generated message elements and user generated message elements. By way of example, a user can periodically download message element files (e.g., "sticker packs") containing various message elements to a client-computing device (e.g., a mobile phone, tablet, laptop, etc.). For example, in one embodiment, a message element file can contain a large number of message elements (e.g., illustrations, images, and/or animations). Alternatively, a user can create a message element such as an image, an audio or video file, an illustration, text, etc.

Each message element or type of message element can include an identifier. The electronic communication system can associate pairs or groups of identifiers with an identifier of one or more augmented or alternative message elements. This association can allow the electronic communication system to replace corresponding message elements with the augmented or alternative message elements.

In response to identifying two associated message elements in a communication thread, the electronic communication system can utilize metadata associated with the first and the second message elements to identify a third message element. The electronic communication system can then replace the first and second associated message elements in the communication thread with the identified third message element. In one or more embodiment, the third message element is an animation showing an interaction between illustrations of the first and the second message elements.

In one or more embodiments, and from the user's perspective, the electronic communication system presents a seem-less display that shows the message element from the first user and the message element from the second user interacting with each other. This added interaction between the message elements adds an elegant and robust layer of expression to what previously consisted of users simply sending images back and forth. The electronic communication system can facilitate the development and distribution of one or more message element files to users for use in electronic communications.

As used herein, an "electronic communication" refers to an electronic message sent from a user to one or more co-users. A "social networking system post" refers to an electronic communication sent from one user to one or more co-users associated with the user via a social networking system. In one embodiment, a social networking system post is an electronic communication from a user that the social networking system posts to a newsfeed (i.e., a "wall") associated with every friend of the user. Additionally or alternatively, a social networking system post can be an electronic communication from a user that the social networking system adds to a newsfeed associated with a particular group or community of social networking system users.

In one or more embodiments, an "electronic message" refers to a message between a sender and a recipient(s). Rather than posting an electronic message to a newsfeed, as described above, the social networking system can deliver the electronic message to a private inbox associated with the recipient. Additionally or alternatively, an electronic message can be a private message between only a sender and a group of recipients. In that case, the social networking system can deliver a copy of the private message to an inbox associated with each member of the group of recipients. Other examples of electronic messages include text messages, instant messages, or any other electronic message.

In one or more embodiments, electronic communications are associated with structured data. As used herein, "structured data" can include any data that is structured into specific groups, fields, or categories and/or associated with particular aspects of an electronic message. Structured data can include metadata associated with node and edge information related to the social networking system post, information related to the electronic message, information related to the author of the social networking system post or electronic message, and interaction information related to the social networking system post or electronic message within the social networking system. To illustrate, structured data for a social networking system post may include the text of the social networking system post, information related to the author of the social networking system post, interaction data related to the social networking system post including comments added to the social networking system post by other social networking system users, images included in the social networking system post (e.g., digital photographs), video, audio, etc.

Metadata associated with electronic messages can include information that classifies an electronic communication and indicates the source of the electronic communication. The electronic communication system can use the classification information included in the metadata to organize and/or retrieve a particular electronic communication. Similarly, the electronic communication system can use the source information included in the metadata to identify information related to the social networking system user who submitted a particular electronic communication.

In one or more embodiments, the electronic communication system can organize electronic messages between users into communication threads. As used herein, a "communication thread" is a group of electronic communications (i.e., electronic messages) sent back and forth between/among two or more users. In one or more embodiments, user may have multiple communication threads with co-users. Accordingly, the electronic communication system can organize a user's communication threads according to the co-users included in each communication thread.

FIG. 1 illustrates a schematic diagram illustrating an example embodiment of an electronic communication system 100 (or simply "system 100"). As shown in FIG. 1, the system 100 may include various components for performing the processes and features described herein. For example, as shown in FIG. 1, the system 100 may include, but is not limited to, one or more server devices 101, a host system 102, an electronic communication manager 104, and client-computing devices 106*a* and 106*b*. The electronic communication manager 104 can include, but is not limited to, a communication manager 122, a message element director 124, and data storage 126, which includes user data 128 and communication data 130. The client-computing devices 108*a* and 108*b* can include messaging applications 108*a* and 108*b*, which include display managers 110*a* and 110*b*, user input detectors 112*a* and 112*b*, message element managers 114*a* and 114*b*, and application data storages 116*a* and 116*b*, which include user data 118*a* and 118*b* and message element data 120*a* and 120*b*.

The host system 102, each of the components 122-126 of the electronic communication manager 104, and each of the components 110*a*, 110*b* through 116*a*, 116*b* of the messaging applications 108*a*, 108*b* can be implemented using a computing device including at least one processor executing instructions that cause the system 100 to perform the processes described herein. In some embodiments, the components 102-126 can be implemented by a single server device 101, or across multiple server devices 101. Additionally or alternatively, a combination of one or more server devices and one or more client devices can implement the components 102-126. Furthermore, in one embodiment, the components 102-126 can comprise hardware, such as a special-purpose processing device to perform a certain function. Additionally or alternatively, the components 102-126 can comprise a combination of computer-executable instructions and hardware.

In one or more embodiments the host system can comprise a messaging hosts that allows for the exchange of electronic messages between user accounts or client-computing devices 106*a*, 106*b*. Additionally or alternatively, the host system 102 can comprise a social networking system that allows for messaging. In such cases, the host system 102 can include a social graph 132 as described in greater detail below.

In one or more embodiments, the messaging application 108*a*, 108*b* can be a native application installed on the client-computing device 106*a*, 106*b*. For example, the messaging application 108a, 108b may be a mobile application that installs and runs on a mobile device, such as a smart phone or a tablet. Alternatively, the messaging application 108a, 108b can be a desktop application, widget, or other form of a native computer program. Alternatively, the messaging application 108a, 108b may be a remote application accessed by the client-computing device 106a, 106b. For example, the messaging application 108a, 108b may be a web application that is executed within a web browser of the client-computing device 106a, 106b.

As mentioned above, and as shown in FIG. 1, the messaging application 108a, 108b can include a display manager 110a, 110b. The display manager 110a, 110b can provide, manage, and/or control a graphical user interface (or simply "user interface") that allows a user to compose, view, and submit electronic messages. For example, the display manager 110a, 110b can provide a user interface that facilitates the display of one or more communication threads of electronic messages. Likewise, in one or more embodiments, the display manager 110a, 110b can provide a user interface that facilitates the display of a social network system user's newsfeed or wall.

More specifically, the display manager 110a, 110b can facilitate the display of a user interface (e.g., by way of a display device associated with the client-computing device 106a, 106b). For example, the display manager 110a, 110b may provide a user interface of a plurality of graphical components, objects, and/or elements that allow a user to compose, send, and receive electronic messages. More particularly, the display manager 110a, 110b may direct the client-computing device 106a, 106b to display a group of graphical components, objects, and/or elements that enable a user to view electronic messages.

In addition, the display manager 110a, 110b may direct the client-computing device 106a, 106b to display one or more graphical objects, controls, or elements that facilitate user input for composing, sending, and/or submitting an electronic message. To illustrate, the display manager 110a, 110b may provide a user interface that allows a user to provide user input to the messaging application 108a, 108b. For example, the display manager 110a, 110b can provide one or more user interfaces that allow a user to input one or more types of content into an electronic message. As used herein, "content" refers to any data or information included as part of an electronic message. For example, the term "content" will be used herein to generally describe text, message elements, images, digital media, files, location information, or any other data that can be included as part of an electronic message.

The display manager 110a, 110b can also facilitate the input of text or other data included in an electronic message. For example, the display manager 110a, 110b can provide a user interface that includes a touch screen keyboard. A user can interact with the touch screen keyboard using one or more touch gestures to input text as part of an electronic message. For example, a user can use the touch screen keyboard to enter a text of an electronic message. In addition to text, the user interface including the touch screen keyboard, can facilitate the input of various other characters, stickers, symbols, icons, emoticons, or other information.

Furthermore, the display manager 110a, 110b can provide and transition between two or more graphical user interfaces. For example, in one embodiment, the display manager 110a, 110b can provide a newsfeed to a social networking system user containing one or more social networking system posts from co-users associated with the user via the social networking system. Later, in response to detected input from the user or the electronic communication manager 104, the display manager 110a, 110b can transition to a second graphical user interface that includes a listing of various communication threads including the user.

As further illustrated in FIG. 1, the messaging application 108a, 108b can include a user input detector 112a, 112b. In one or more embodiments, the user input detector 112a, 112b can detect, receive, and/or facilitate user input in any suitable manner. In some examples, the user input detector 112a, 112b can detect one or more user interactions with respect to a user interface. As referred to herein, a "user interaction" means a single interaction, or combination of interactions, received from a user by way of one or more input devices.

For example, the user input detector 112a, 112b can detect a user interaction from a keyboard, mouse, touch pad, touch screen, and/or any other input device. In the event the client-computing device 106a, 106b includes a touch screen, the user input detector 112a, 112b can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 112a, 112b may additionally, or alternatively, receive data representative of a user interaction. For example, the user input detector 112a, 112b may receive one or more user configurable parameters from a user, one or more user commands from the user, and/or any other suitable user input. The user input detector 112a, 112b may receive input data from one or more components of the host system 102, or from one or more remote locations.

The messaging application 108a, 108b can perform one or more functions in response to the user input detector 112a, 112b detecting user input and/or receiving other data. Generally, a user can control, navigate within, and otherwise use the messaging application 108a, 108b by providing one or more inputs that the user input detector 112a, 112b can detect. For example, in response to the user input detector 112a, 112b detecting user input, one or more components of the messaging application 108a, 108b allow a user to select a recipient for an electronic message, compose an electronic message, select content to include in an electronic message, and/or send an electronic message to a recipient. Additionally, in response to the user input detector 112a, 112b detecting user input, one or more components of the messaging application 108a, 108b allow a user to navigate through one or more user interfaces to review received electronic messages, social networking system posts, etc.

Also as illustrated in FIG. 1, the messaging application 108a, 108b can include a message element manager 114a, 114b. In one or more embodiments, the message element manager 114a, 114b can identify message elements in a communication thread. For example, as described above, a communication thread can include multiple electronic messages and message elements sent back and forth between two or more users. To illustrate, a first user may send a sticker featuring a thumbs-up to a second user, which the first user and the second user can then view as part of a communication thread between the first user and the second user. The second user may then send another thumbs-up sticker back to the first user. At that point, the message element manager 114a, 114b can identify both thumbs-up stickers in the communication thread associated with the first user and the second user.

Furthermore, the message element manager 114a, 114b can analyze metadata associated with identified message elements. For example, as mentioned above, a message element may be associated with metadata that includes information by which the message element may be classified. This information can include a category associated with the message element, as well as a description and a unique identifier associated with the message element. The metadata can also include information identifying other corresponding message elements, as well as information related to the user who submitted the message element for inclusion in the communication thread. Additionally, the metadata associated with the message element can include the date and time the message element was submitted to the communication thread.

Based on the information found in the metadata associated with a message element, as well as on other information in a communication thread, the message element manager 114a, 114b can determine whether a trigger is present or true indicating that the identified message elements should be replaced. As described above, if the message element manager 114a, 114b determines that a first message element and a second message element were sent or added to a communication thread within a threshold amount of time, the message element manager 114a, 114b can replace the first and second message elements with a third message element. In one or more embodiments, a user can specify the threshold amount of time. Alternatively, the message element manager 114a, 114b can use a default amount of time (e.g., 30 seconds, etc.) as the threshold amount of time. The message element manager 114a, 114b can base the determination of whether the first message element and the second message element were submitted within the threshold amount of time on the date and time both message elements were submitted.

The message element manager 114a, 114b can identify other types of triggers based on the content of a text-based message. For example, the message element manager 114a, 114b can utilize natural language processing to determine whether a trigger exists between two or more text-based messages. To illustrate, the message element manager 114a, 114b can determine an appropriate trigger exists between a message from a first user such as, "should we meet for lunch at that new place?" and a message from a second user including, "Yes! That place on $1^{st}$ Street!" In that case, the message element manager 114a, 114b can generate an interaction including a map display that is included in the message thread.

In response to the determination of whether the first and second message elements were submitted within a threshold amount of time, the message element manager 114a, 114b can identify a third message element. For example, as mentioned above, a user may download a message element file including the first message element and the second message element to the client-computing device 106a, 106b. The message element file can include a collection of message elements along with an identifier associated with each message element. In one or more embodiments, the message element file can be organized based on categories, descriptions, or even unique identifiers of the message elements therein, such that corresponding message elements are grouped together. In additional or alternative embodiments, the message element manager 114a, 114b can be restricted to only identify the third message element when the relationship coefficient between the users communicating in the communication thread is above a predetermined threshold (e.g., based on social networking system activity data associated with the users).

Thus, in one or more embodiments and in order to identify the third message element that corresponds to the first and second message elements, the message element manager 114a, 114b can utilize the metadata associated with the first and second message elements. For example, in one embodiment, the message element manager 114a, 114b can identify the third message element based on identifiers (e.g., identification numbers, keywords, titles, etc.) associated with the first and second message elements. In another embodiment, the message element manager 114a, 114b may identify the third message element based on descriptions associated with the first and second message elements.

It follows that in one or more embodiments, the message element manager 114a, 114b can also manage one or more message element files. For example, when a user initially downloads and installs a message element file on the client-computing device 106a, 106b, the message element manager 114a, 114b can store the message element file as well as catalog the message elements contained therein. In at least one embodiment, the message element manager 114a, 114b can also contact the electronic communication manager 104 to periodically check for updates to the one or more message element files.

The message element file can have one of various structures. For example, the message element file can be formatted as a lookup table, where message elements and their associated metadata are stored at intersections of rows and columns. In that case, the message elements may be stored based on a unique identifier and a keyword. Alternatively, the message element file can be formatted as a linked-list, a hash table, or as any other type of storage structure suitable for storing message elements.

In one or more embodiments, a user of a client-computing device 106a, 106b may utilize a message element that is not from a message element file. For example, a user may send a digital photograph stored on the client-computing device 106a to a user of the client-computing device 106b. In that case, the message element manager 114a, 114b can add the digital photograph message element to a communication thread between both users. In response to the user of the client-computing device 106b sending another digital photograph back to the user of the client-computing device 106a, the message element manager 114a, 114b can identify both digital photograph message elements and determine that both digital photograph message elements were sent within a threshold amount of time.

At that point, in one or more embodiments, rather than identifying a third message element from a message element file, the message element manager 114a, 114b can identify a template based on a type associated with the first and second message elements. A message element can be associated with a type such as, but not limited to a digital photograph file, a digital video file, a digital audio file, a clip art file, or an image file. For example, if the type of the message elements identified by the message element manager 114a, 114b is a digital photograph file, the message element manager 114a, 114b can identify a template associated with digital photograph files.

Once the message element manager 114a, 114b identifies an appropriate template, the message element manager 114a, 114b can generate a third message element based on the template and the identified first and second message elements in the communication thread. For example, in an embodiment where the first and second message elements have a type of digital photograph file, the message element manager 114a, 114b can identify a template that is a layout for two digital photograph files. Accordingly, in order to generate a third message element, the message element manager 114a, 114b can position the first and second message elements within the identified template to create a collage or slideshow effect. In additional or alternative embodiments, the message element manager 114a, 114b can generate the third message element based on more than two identified message elements within a communication thread as long as the identified message elements were all submitted within the threshold amount of time. Furthermore, in other alternative embodiments, the message element manager 114a, 114b can generate the third message element by layering digital video files or digital audio files, rather than by using a template.

After the message element manager 114a, 114b identifies or generates a third message element based on metadata associated with the first and second message elements, the message element manager 114a, 114b can cause the display of a communication thread to change. For example, as described above, the electronic communication system 100 can replace the first and second message elements in a communication thread with the third message element. In one or more embodiments, in order to replace the first and second message elements with the third message element, the message element manager 114a, 114b can re-render the communication thread without the first and second message elements. For instance, re-rendering the communication thread without the first and second message elements can involve removing or hiding cells in the communication thread containing the first and second message elements.

Following the removal of the first and second message elements, the message element manager 114a, 114b can add the third message element to the communication thread. In one or more embodiments, in order to add the third message element to the communication thread, the message element manager 114a, 114b can render the communication thread with a new cell containing the third message element. In at least one embodiment, the message element manager 114a, 114b can center the third message element in the new cell such that the third message element appears centered within the communication thread.

As mentioned above, in some embodiments, the third message element is an animation of an interaction between the first message element and the second message element. For example, if the first message element is a "thumbs up" sticker (e.g., an illustration of a thumbs up) and the second message element is also a "thumbs up" sticker, the third message element may be an animation of the two illustrations forming fists and "fist-bumping" in the center of the communication thread. In at least one embodiment, once the animation displayed by the third message element completes, the message element manager 114a, 114b can replace the third message element with the first and second message elements such that the communication thread appears unchanged and the message elements simply appear to "come to life."

In one or more embodiments, the message element manager 114a, 114b can identify metadata associated with the third message element to determine when to replace the third message element with the first and second message elements. For example, in the "fist-bumping" third message element described above, the animation may take five seconds to complete. In at least one embodiment, the metadata associated with the third message element can include the amount of time that the third message element takes to "play" or complete. The message element manager 114a, 114b can determine when this amount of time elapses after replacing the first and second message elements with the third message element.

After the appropriate amount of time elapses, the message element manager 114a, 114b can replace the third message element with the first and second message elements. For example, in one or more embodiments, in order to replace the third message element with the first and second message elements, the message element manager 114a, 114b can again re-render the communication thread without the third message element by removing or hiding the cell in the communication thread containing the third message element. Following this, the message element manager 114a, 114b, can add the first and second message elements back into the communication thread by rendering the communication thread with a new cell containing the first message element, and a new cell containing the second message element. In one or more embodiments, the message element manager 114a, 114b can render the communication thread including the first and second message elements such that the first and second message elements are back in their original places. Thus, from the user's perspective, the message element manager 114a, 114b can remove and add message elements in such a way that the user is not aware of the communication thread being re-rendered, but rather only sees the interaction between the first and second message elements.

Even though the actions of the message element manager 114a, 114b are described as taking place on the client-computing device 106a, 106b, in additional or alternative embodiments, these same actions can take place at the server level. For example, in one embodiment, the functionality of the message element manager 114, 114b reside within the electronic communication manager 104. In that case, the electronic communication manager can intercept electronic communications moving across the host system 102 and identify message elements as needed.

As mentioned above, and as illustrated in FIG. 1, the messaging application 108a, 108b can also include application data storage 116a, 116b. As shown the application data storage 116a, 116b can include user data 118a, 118b and message element data 120a, 120b. In one or more embodiments, the user data 118a, 118b can include data representative of user information, such as described herein. Similarly, in one or more embodiments, message element data 120a, 120b can include data representative of message element information, such as described herein.

As illustrated in FIG. 1, the host system 102 can include the electronic communication manager 104. In one or more embodiments, the electronic communication manager 104 can manage all activities in connection with electronic communications sent among users of the host system 102. For example, as mentioned above, a user can send electronic messages to one or more co-users of the host system 102.

In at least one embodiment, and as shown in FIG. 1, the electronic communication manager 104 can include a communication manager 122. The communication manager 122 can facilitate receiving and sending data to and from the host system 102. In particular, communication manager 122 can facilitate sending and receiving electronic communications. For example, the communication manager 122 can package content to be included in an electronic communication and format the electronic communication in any necessary form that is able to be sent through one or more communication channels and using an appropriate communication protocol, as described herein.

Furthermore, the communication manager 122 can facilitate requesting content from sources outside of the host system 102. To illustrate, in one case a third party (e.g., a commercial entity, or author) may submit a message element file including multiple message elements to the host system 102 for distribution to users. In that case, the communication manager 122 can communicate with the third party in order to receive the message element file. Similarly, the communication manager 122 can communicate with additional third parties in order to receive updates or replacements to previously received message element files.

Additionally, as shown in FIG. 1, the element communication manager 104 can include a message element director 124. In one or more embodiments, the message element director 124 can manage, organize, and distribute message element files and updates to message element files. For example, as mentioned above, in order to include a message element in an electronic communication, a user generally has to download a message element file to a client-computing device 106a, 106b. In order to download a message element file, the messaging application 108a, 108b can contact the message element director 124 for the requested file. In at least one embodiment, in response to a download request from the messaging application 108a, 108b, the message element director 124 can then provide the requested message element file.

After providing a message element file to a messaging application 108a, 108b, the message element director 124 can keep a record of message element files that have been provided to the social networking system user associated with the messaging application 108a, 108b. Then, in one or more embodiments and in response to receiving an update from the source or author of a particular message element file, the message element director 124 can push the update to the messaging application 108a, 108b that has previously downloaded the particular message element file.

Furthermore, in at least one embodiment, the message element director 124 can prompt the recipient of an electronic communication to download a needed message element file. For example, in one embodiment, the sender of an electronic communication may have a particular message element file containing a particular message element downloaded on the sender's client-computing device 106a. In response to the sender sending an electronic communication containing the particular message element to a recipient, the message element director 124 can intercept the electronic communication and determine whether the intended recipient of the electronic communication has ever downloaded the particular message element file containing the particular message element to the client-computing device 106b. If the message element director 124 determines that the recipient has not downloaded the particular message element file, the message element director 124 can prompt the recipient to request the appropriate download.

Furthermore, as mentioned above, and as illustrated in FIG. 1, the electronic communication manager 104 can also include a data storage 126. As shown, the data storage 126 can include user data 128 and communication and message element data 130. In one or more embodiments, the user data 128 can include data representative of user information, such as described herein. Similarly, in one or more embodiments, the communication and message element data 130 can include communication and multimedia information, also as described herein.

In one or more embodiments where the host system 102 comprises a social-networking system, the host system 102 may include a social graph 132 for representing and analyzing a plurality of users and concepts. Node information 134 of the social graph 132 can store node information comprising nodes for users, nodes for concepts, nodes for transactions, and nodes for items. Edge information 136 of the social graph 132 can store edge information comprising relationships between nodes and/or actions occurring within the social networking system. Further detail regarding social-networking systems, social graphs, edges, and nodes is presented below with respect to FIGS. 8 and 9.

Figure 2:
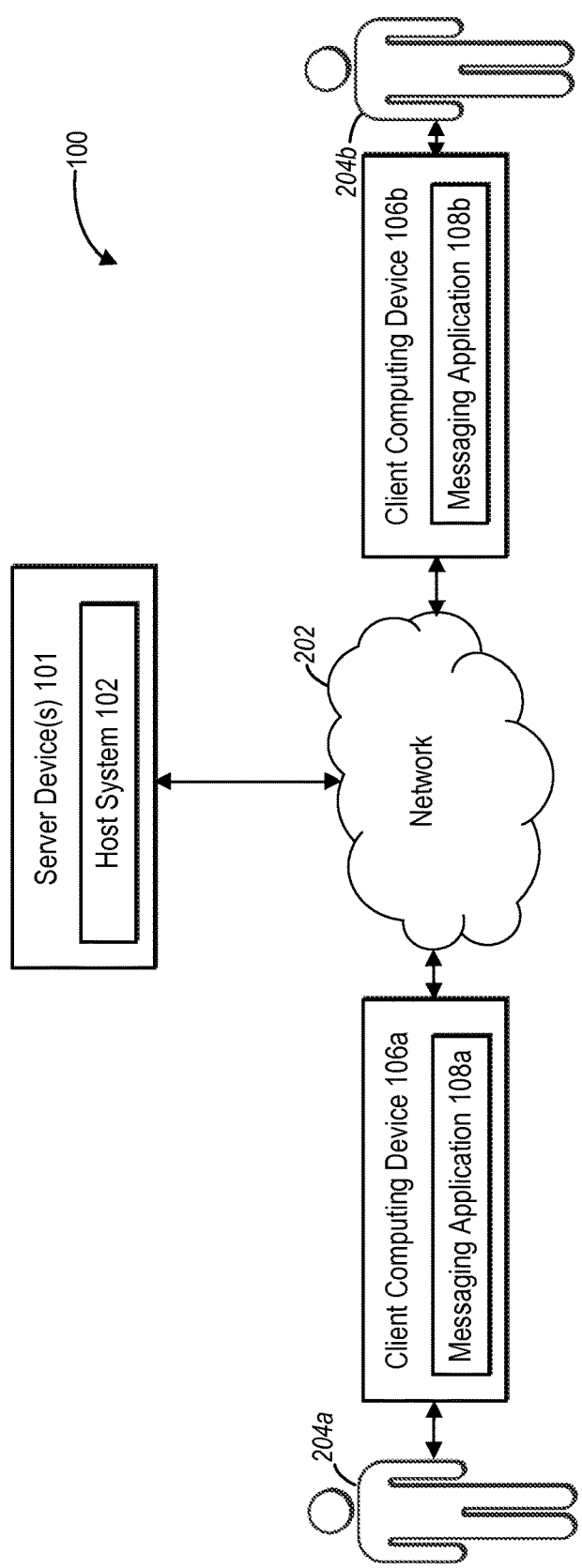
FIG. 2 illustrates a block diagram of an environment for implementing the electronic communication system in accordance with one or more embodiments.

FIG. 2 illustrates an example schematic diagram of electronic communication system 100. As illustrated in FIG. 2, the electronic communication system 100 may include client-computing devices 106a and 106b and messaging applications 108a, 108b, and the server device(s) 101 and the host system 102, which are communicatively coupled through a network 202. Also as illustrated in FIG. 2, users 204a and 204b may interact with client-computing devices 106a and 106b respectively in order to access content and/or services on the host system 102. Each of the client-computing devices 106a and 106b may access the host system 102 via the messaging applications 108a, 108b, as described above.

The client-computing devices 106a and 106b and the host system 102 can communicate via the network 202, which may include one or more networks and may use one or more communication platforms or technologies suitable for transmitting data and/or communication signals. In one or more embodiments, the network 202 may include the Internet or World Wide Web. The network 202, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of the client-computing devices 106a and 106b, the host system 102, and the network 202, various additional arrangements are possible. For example, the client-computing devices 106a and 106b may directly communicate with the host system 102, bypassing the network 202. Additional details relating to the network 202 are explained below with reference to FIG. 8.

As illustrated in FIG. 2, the users 204a/204b can use the electronic communication system 100 to send electronic messages including message elements. As described above, the users 204a and 204b may be individuals (i.e., human users), businesses, groups, or other entities. Although FIG. 2 illustrates two users 204a and 204b, it is understood that the electronic communication system 100 can allow a plurality of users to exchange electronic messages, with each of the plurality of users interacting with the electronic communication system 100 through a corresponding plurality of client-computing devices.

With reference to the electronic communication system 100 described herein, any of the users 204a, 204b may be a sender of an electronic message, and any of the user 204a, 204b may be a recipient of an electronic message. In certain embodiments, the host system 102 can ensure the users 204a, 204b to be "friends" via the host system 102 before they can send and receive electronic communications among each other. In additional or alternative embodiments, the host system 102 may simply ensure that user's sending the receiving electronic communications merely be active users of the host system 102.

The client-computing devices 106a, 106b may include various types of computing devices. For example, the client-computing devices 106a, 106b can include a mobile device such as a mobile telephone, a smartphone, a PDA, a tablet, a laptop or a non-mobile device such as a desktop, a server, or another type of computing device. Further, the client-computing devices 106a, 106b may run dedicated social networking applications (e.g., such as the social networking application 108a, 108b, as described above in relation to FIG. 1) associated with the host system 102 to access social networking content (e.g., posts, messages, sale listings, profiles, etc.) associated with the electronic communication system 100. Additional details with respect to the client-computing devices 106a, 106b are discussed below with respect to FIG. 7.

As will be described in more detail below, the components of the electronic communication system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-4D and the description that follows illustrate various example embodiments of the GUIs and features that are in accordance with general principles as described above.

For example, FIGS. 3A-4D illustrate various views of GUIs provided at the client-computing devices 106a, 106b by way of the messaging applications 108a, 108b. As mentioned above, in some embodiments, a client-computing device (i.e., the client-computing device 106a, 106b) can implement and/or provide features from the electronic communication system 100. For example, FIG. 3A illustrates a client-computing device 300 of a user (e.g., the user 204a) that may implement one or more of the components or features of the electronic communication manager 104. As shown, the client-computing device 300 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 3A, the client-computing device 300 includes a touch screen display 302 that can display user interfaces and by way of which user input may be received and/or detected. As used herein, a "touch screen display" refers to the display of a touch screen device. In one or more embodiments, a touch screen device may be the client-computing device 106a, 106b with at least one surface upon which a user may perform touch gestures (e.g., a laptop, a tablet computer, a personal digital assistant, a media player, a mobile phone, etc.). Additionally or alternatively, the client-computing device 300 may include any other suitable input device, such as a touch pad or those described below in reference to FIG. 7.

In FIG. 3A, the touch screen display 302 of the client-computing device 300 displays a communication thread GUI 304 provided by the display manager 110a, 110b installed thereon. In one or more embodiments, the display manager 110a, 110b provides the communication thread GUI 304 in order to display a series of electronic messages sent back and forth between two social networking system users. For example, the communication thread GUI 304 displayed by the communication thread GUI 304 includes electronic messages 308a-308d sent between the user of the client-computing device 300 (e.g., the user 204a) and another user (e.g., the user 204b). The communication thread 306 can display the electronic messages 308a-308d chronologically with the oldest electronic message 308a at the top of the communication thread 306 and the newest electronic message 308d at the bottom of the communication thread 306. In one or more alternative embodiments, the flow of electronic messages in the communication thread 306 may be reversed, or in any other direction that is suitable for a particular implementation.

The communication thread GUI 304 can also include additional controls for use in composing and sending one or more electronic messages. For example, as shown in FIG. 3A the communication thread GUI 304 can include a collection of input controls 312. By utilizing the collection of input controls 312 in addition to a touch screen keyboard, a user of the client-computing device 300 can compose and send an electronic message containing text, message elements, etc.

Also as shown in FIG. 3A, the communication thread 306 displays the electronic messages 308a-308d so as to indicate the sender of each electronic message. For example, the communication thread 306 orients the electronic messages 308a and 308c and the message element 310a against one side of the communication thread GUI 304 in order to indicate "Michael" (e.g., the user 204b) is the sender of the electronic messages 308a and 308c. Similarly, the communication thread 306 orients the electronic messages 308b and 308d against the opposite side of the communication thread GUI 304 in order to indicate the user of the client-computing device 300 (e.g., the user 204a) is the sender of the electronic messages 308b and 308d. In one or more embodiments, the communication thread 306 can also include additional information such as user names and profile pictures in order to indicate the sender of each electronic message in the communication thread 306.

In one or more embodiments, the display manager 110a of the messaging application 108a installed on the client-computing device 300 (e.g., the client-computing device 106a) renders the communication thread 306 by including individual cells that each contain at least one electronic message or message element. For example, in at least one embodiment, the communication thread 306, shown in FIG. 3A, is made of multiple cells that each include one electronic message or one message element. The display manager 110a can render each cell such that the cell is invisible to the user of the client-computing device 300, even though the electronic message and/or multimedia contained therein is visible.

As mentioned above, the message element manager 114a can identify message elements in a communication thread. More particularly, when the message element 310a comprises a sticker, the user 204b can select a control from the input controls 312 to open a collection of stickers. The user 204b can then select a desired sticker from the collection of stickers. Alternatively, the input controls 312 can include the desired sticker (e.g., the thumbs-up sticker as shown in FIG. 3A). In one or more embodiments, upon selecting a desired sticker 310a, the messaging application 108a can cause the client-computing device to send the identifier for the sticker 310a to the host system 102, which can then forward the identifier to the client-computing device 300 of the user 204a. The messaging application 108a running on the client-computing device 300 can then use the identifier to retrieve and render the sticker 310a. In particular, the messaging application 108a can retrieve the message element (i.e., the illustration of the thumbs up) from the message element data 120a in the application data storage 116a on the client-computing device 106a.

As shown in FIG. 3B, the user of the client-computing device 300 (e.g., the user 204a) can respond to the message element 310a by sending Michael (e.g., the user 204b) a corresponding message element 310b. In one or more embodiments, in response to the addition of a new electronic communication, the message element manager 114a can again analyze the communication thread 306 for a second message element in addition to the message element 310a. When the message element manager 114a identifies the second message element 310b, the message element manager 114a can determine whether a trigger exists with respect to the message element 310a and the message element 310b. For example, the message element manager 114a can determine if the message elements 310a, 310b were submitted consecutively (i.e., no intervening messages or message element) and/or within a threshold amount of time. As described above, the message element manager 114a can make this determination based on metadata associated with the message elements 310a and 310b.

In an additional or alternative embodiment, the message element manager 114a can determine whether the first message element 310a and the second message element 310b were submitted within a secondary time frame if the message element manager 114a determines that the first message element 310a and the second message element 310b were not submitted within the threshold amount of time. For example, if the first message element 310a and the second message element 310b were submitted within a secondary time frame, the message element manager 114a can identify a third message element that is different from the message element that would have been selected had the first message element 310a and the second message element 310b been submitted within the threshold amount of time. For instance, if the first message element 310a is a thumbs up sticker and the second message element 310b is also a thumbs up sticker, the message element manager 114a may identify a third message element containing an animation of a missed "high-five" in response to determining that the first message element 310a and the second message element 310b were not submitted within the threshold amount of time, but were submitted within the secondary time frame.

In response to determining that the message elements 310a and 310b were submitted within a threshold amount of time, the message element manager 114a can identify a third message element and replace the message elements 310a and 310b with the third message element in the communication thread 306. In one or more embodiments, in order to identify the third message element, the message element manager 114a can access a message element file on the client-computing device 106a containing the message elements 310a and 310b. For example, in at least one embodiment, the message elements 310a and 310b are associated with metadata that includes information identifying a source (e.g., a message element file, an author, a hyperlink to a website, etc.) from which each message element 310a, 310b came. Accordingly, the message element manager 114a can access the message element file indicated by the metadata associated with the message elements 310a and 310b.

Once the message element manager 114 accesses the appropriate message element file, the message element manager 114 can further utilize the metadata associated with the message elements 310a and 310b to identify a third message element. For example, in one or more embodiments, the metadata associated with the message elements 310a and 310b can include information indicating an association between the message elements 310a and 310b (e.g., based on keywords, descriptions, identifiers, etc. included in the metadata). This same information can also indicate an association between the message elements 310a, 310b and a third message element. By way of example, the message elements 310a and 310b may be associated with metadata that indicates a third message element that corresponds with both the message element 310a and the message element 310b. For instance, in one embodiment, the third multimedia media element that corresponds with the message element 310a and the message element 310b is an animation of the message element 310a interacting with the message element 310b.

Accordingly, once the message element manager 114a identifies the third message element that corresponds to the message element 310a and the message element 310b, the message element manager 114a can re-render the communication thread 306 so as to remove the message element 310a and the message element 310b. As mentioned above, the message element manager 114a can remove the message elements 310a and 310b by deleting the cells 311a, 311b in the communication thread 306 that contain the message elements 310a and 310b. In an alternative embodiment, the message element manager 114a can remove the message elements 310a and 310b by simply hiding the cells 311a, 311b in the communication thread 306 that contain the message elements 310a and 310b.

Figure 3C:
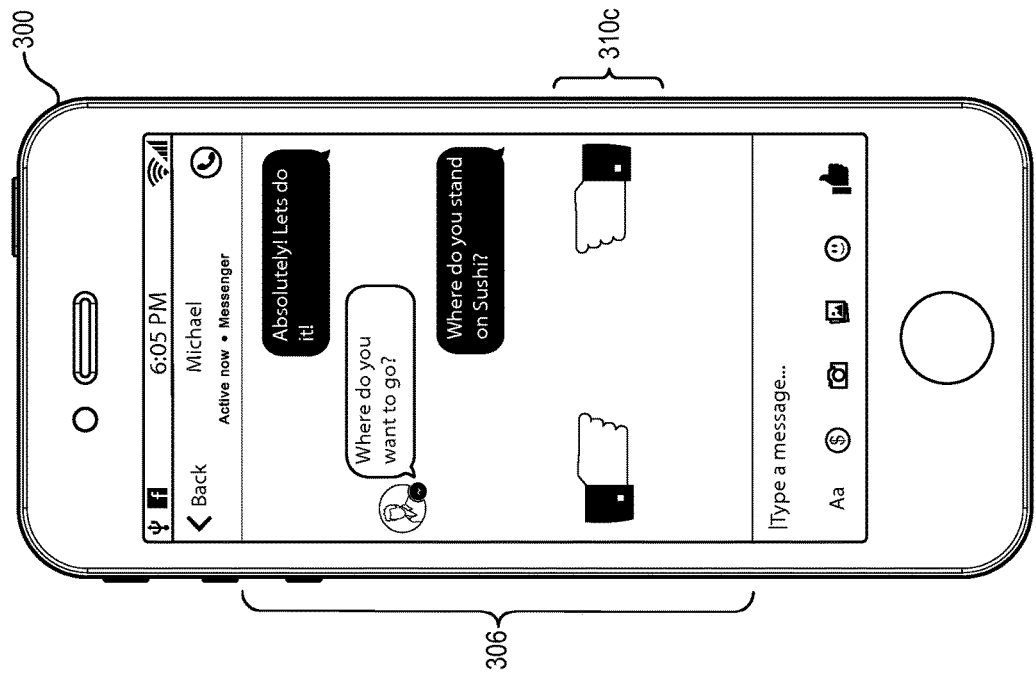

Next, the message element manager 114a can add the third message element to the communication thread 306. For example, as shown in FIG. 3C, the message element manager 114a can add the message element 310c to the communication thread 306 within the communication thread GUI 304 on the touch screen display 302 of the client-computing device 300. In one or more embodiments, the message element manager 114a can add the message element 306 by rendering a new cell 311c in the communication thread 306 that contains the message element 306. In at least one embodiment, the message element manager 114a can center the new cell 311c containing the message element 310c in the communication thread 306. The message element manager 114a can further center the message element 310c in the new cell 311c.

In one or more embodiments, the new cell 311c can be larger than either the first cell 311a or the second cell 311b. For example, the new cell 311c can have a size equal to a combined size of the first and second cells 311a, 311b. The larger new cell 311c can allow for larger or more complex message elements.

As mentioned above, once the message element manager 114a has replaced the message elements 310a and 310b with the message element 310c, the message element manager 114a can leave the message element 310c in the communication thread 306 indefinitely. Alternatively, the message element manager 114a can, after a predetermined amount of time, remove the message element 310c and add the message elements 310a and 310b back to the communication thread 306 in their original places. The message element manager 114a can make the determination as to whether to leave the message element 310c indefinitely or to remove the message element 310c after a predetermined amount of time based on metadata associated with the message element 310c and/or user-configured settings associated with the messaging application 108a.

Figure 3D:
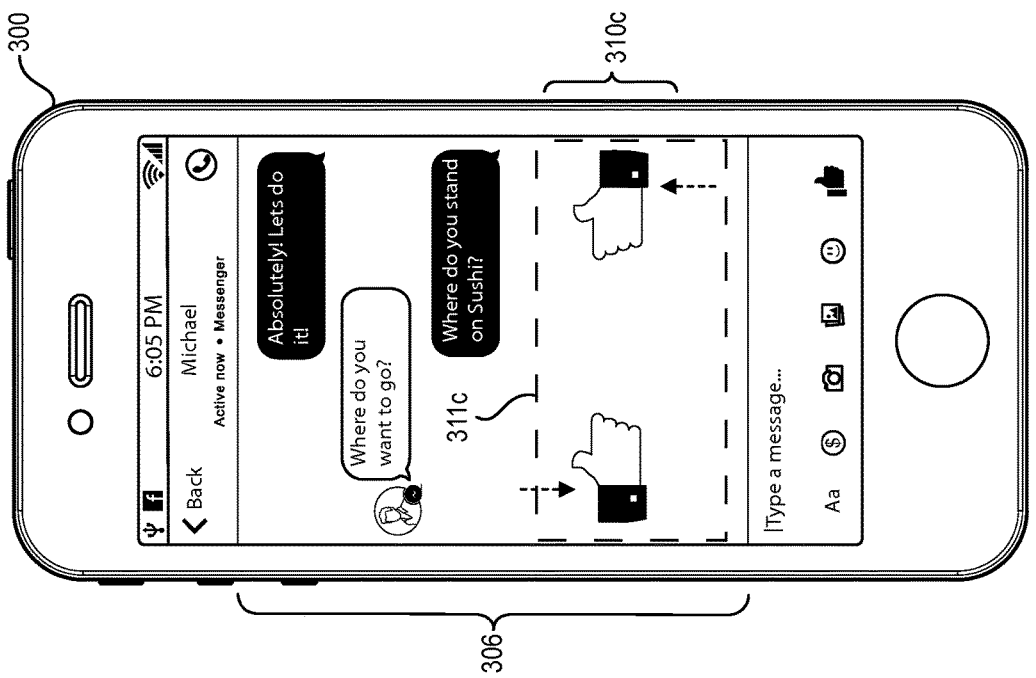

In response to determining that the message element 310c should not be left in the communication thread 306 indefinitely, the message element manager 114a can determine the correct amount of time to wait before replacing the message element 310c. For example, as shown in FIGS. 3C-3E, the message element manager 114a can include an animation of the illustrations of message elements 310a and 310b performing a "fist-bump" within the communication thread 306. Namely, in FIG. 3C, the message element 310c shows the two thumbs-up illustrations facing each other with the thumbs of both fists closing along the directional arrows. Next, in FIG. 3D, the message element 310c shows the two thumbs-up illustrations formed into fists. Then, in FIG. 3E, the message element 310c shows the two fists coming together in the center of the communication thread 306 along the directional arrows to perform a "fist-bump."

Accordingly, the metadata associated with the message element 310c can include information detailing the amount of time required for the animation to complete (i.e., when the "fist-bump" animation finishes in FIG. 3E). Additionally or alternatively, the message element 310c can simply detect when the animation completes, rather than identifying an amount of time in the metadata associated with the message element 310c. For example, the message element 310c can detect an animation is complete when the animation returns to its initial starting position (e.g., as in FIG. 3C).

In one or more embodiments, once the required amount of time expires or the message element manager 114a detects that the animation is complete, the multimedia manager 114a can remove the message element 310c and re-render the communication thread 306. For example, the multimedia manager 114a can render the communication thread 306 so as to remove the cell 311c containing the message element 310c. Following this, the message element manager 114a can re-render the communication thread 306 to include the cells 311a, 311b containing the message elements 310a and 310b. Furthermore, as shown in FIG. 3F, the message element manager 114a can add the cells containing the message elements 310a and 310b back into the communication thread 306 such they are in their original positions along the directional arrows, as shown in FIG. 3B.

The effect of replacing the message elements 310a and 310b with the message element 310c, only to later swap the message elements 310a and 310b back creates an illusion for the user 204a that makes it appear like the message elements 310a and 310b are actually interacting. In other words, in one or more embodiments, the user 204a is oblivious to the rendering and re-rendering performed by the message element manager 114a. Rather, the rendering and re-rendering are seamless and practically invisible to the user 204a.

Although FIGS. 3A-3F are described as taking place from one user's perspective, all users participating in the communication thread 306 can potentially see the message element interactions described above. For example, depending on whether a user has downloaded the appropriate multimedia file(s) to his or her client-computing device, the multimedia interactions described above can be the same for each user associated with the communication thread 306. If a user has not downloaded the appropriate multimedia file(s), the communication thread 306 will not include the described multimedia interactions.

Thus, the use of augmented message elements can provide messaging conversations with another level of expression. FIGS. 3A-3F illustrate that the original two message elements 310a, 310b are static illustrations (e.g., stickers) and the augmented illustration 310c is an animation that includes the illustrations from the first two message elements 310a, 310b. One will appreciate in light of the disclosure herein, that the electronic communication system 100 can allow for a wide variety of variations in combinations of message elements. For example, the first two message elements can comprise animations, while the augmented or third message element is a static image or a different animation. Furthermore, the augmented or third message element need not include any illustrations from the corresponding message elements that are replaced by the augmented message element.

FIGS. 3A-3F illustrate that the consecutive use of the same message element (e.g., thumbs-up sticker) by two different users within a threshold period of time can trigger the electronic communication system to replace the consecutive message elements with an augmented message element (e.g., fist-bump animation). Thus, the corresponding message elements can comprise the same message element. Alternatively, the corresponding message elements can comprise different message elements. For example, a sticker of a woman dancer and a sticker of a man dancer can trigger an animation of a woman and a man dancing.

Furthermore, the same message element can have various different corresponding message elements associated with different augmented message elements. Thus, upon a first user sending a first message element, a second user can respond with a second message element to trigger a first augmented message element. However, if the second users responds with a third message element, the electronic message system can provide a second augmented message element rather than the first augmented message element.

As mentioned above, the augmented message elements can comprise a wide variety of different elements. For example, as described above in relation to FIGS. 3A-3F, the augmented message element 310c can comprise an animation. In alternative embodiments, the augmented message element 310c can comprise one or both of the corresponding message elements that trigger the augmented message element along with one or more additional features. For example, an augmented message element can add sound or video to one or more corresponding message elements. Still further, an augmented message element can change a size, color, number, orientation, or other feature of one or more corresponding message elements.

In addition to the foregoing, in one or more embodiments, the augmented message element can comprise a message element unavailable to a single user. Thus, in order to invoke the augmented message element, two users may need to provide message elements in a manner that triggers (e.g., provide corresponding message elements consecutively and/or within a given threshold period of time) the electronic communication system to replace the message elements with the augmented message element.

The electronic communication system can also provide assistance to users to notify them of actions that will trigger an augmented message element. For example, the electronic communication system can present relevant assistance information to the user without interrupting the user's natural experience with the messaging application 108a. For example, various actions available to a user may have corresponding new user assistance information to aid the user in completing the actions. The new user assistance information may be presented to the user in a way that allows the user to easily and quickly learn how to perform the corresponding action without unduly disrupting the user's experience with the messaging application 108a.

For example, once a message element has been sent or otherwise entered in to a communications thread that has a corresponding message element, the electronic communication system may present user assistance information that indicate which message element(s) the user can send to invoke an augmented message element. Furthermore, the user assistance information can provide the user with information regarding one or more conditions for triggering an augmented message element (time periods, order of message elements, etc.).

As used herein, the term "user assistance information" may refer generally to any information and/or content used to assist a user of an application to become familiar with one or more features of the application. In some embodiments, an instance of user assistance information can include audio and/or graphical content—such as text, images, animations, videos, sounds, music, and speech—that provides information related to an action available within a graphical user interface. For example, presenting user assistance information for a particular action may include presenting instructions for performing the action and a visual demonstration of the action In some embodiments, rather than utilizing message elements from a downloaded message element file, the users 204a and 204b can create their own message elements from files stored on their client-computing devices 106a, 106b. For example, as shown in FIG. 4A, the user 204a of the client-computing device 300 (e.g., the client-computing device 106a) can create the message element 310d based on a file stored on the client-computing device 300 (e.g., a digital picture file). As shown, the message element manager 114a has added the message element 310d to the communication thread 306 in the communication thread GUI 304 shown on the touch screen display 302 of the client-computing device 300 following the electronic message 308e (i.e., "Check out this picture I took today!"). The user of the client-computing device 300 (e.g., the user 204a) may have selected the file from which to create the message element 310d by utilizing one of the controls in the collection of input controls 312.

Next, the user with whom the user of the client-computing device 300 is communicating (e.g., the user 204b) can reply with an electronic message 308f (e.g., "That's awesome! Take a look at these") and additional message elements 310e and 310f As shown in FIG. 4B, the additional message elements 310e and 310f can also include files from a client-computing device associated with the user with whom the user of the client-computing device 300 is communicating (e.g., the user 204b). As illustrated in FIG. 4B, the user of the client-computing device 300 would have to scroll through the communication thread 306 in order to view all the message elements 310d-310f, which could be bothersome for the user.

At this point, as described above, the message element manager 114a can identify the message elements 310d-310f and can determine that the message elements 310d-310f were added to the communication thread 306 within a threshold amount of time or in accordance with another trigger. Accordingly, because the message elements 310d-310f were submitted within a threshold amount of time, the message element manager 114a can identify a third message element that corresponds with the message elements 310d-310f As mentioned above, however, the message elements 310d-310f did not come from a downloaded message element file. Accordingly, rather than identifying the third message element from a message element file as discussed with regard to FIGS. 3A-3E, the message element manager 114a can identify a template from a pre-existing collection of templates stored on the client-computing device 300 and generate a third message element based on the identified template. In one or more embodiments, the message element manager 114a can identify a template based on a type associated with the message elements 310d-310f (e.g., if the type of the message elements 310d-310f is a digital photograph, the message element manager 114a can identify a template for three digital photographs).

For example, as shown in FIG. 4C, the message element manager 114a can replace the message elements 310d-310f with the message element 310g. In one or more embodiments, the message element manager 114a can generate the message element 310g based on the identified template and the message elements 310d-310f In other words, the message element manager 114a can generate the message element 310g by resizing and positioning the message elements 310d-310f according to the layout of the identified template.

In order to replace the message elements 310d-310f with the message element 310g in the communication thread 306, the message element manager 114a can first remove or hide the cells in the communication thread 306 that contain the message elements 310d-310f. Following this, as shown in FIG. 4C, the message element manager 114a can redistribute the electronic messages 308e, 308f to eliminate gaps left by the removal of the message elements 310d-310f. The message element manager 114a can then re-render the communication thread 306 to include a new cell containing the message element 310g. As illustrated in FIG. 4C, the message element manager 114a can position new cell such that it is centered in the communication thread 306. Similarly, the message element manager 114a can position the message element 310g such that it is centered in the new cell.

In one or more embodiments, the message element manager 114a can provide extra functionality to the message element 310g in order to make the message element 310g interactive. For example, as shown in FIG. 4D, the message element manager 114a can provide the message element controls 314a and 314b in association with the message element 310g in the communication thread 306. In at least one embodiment, in response to the user of the client-computing device 300 clicking the message element control 314a, the message element manager 114a can submit the message element 310g to the host system 102 via the electronic communication manager 104 for inclusion in one or more newsfeeds of social networking system user associated with the user of the client-computing device 300. Furthermore, in response to the user of the client-computing device 300 clicking the message element control 314b, the message element manager 114a can save the multimedia media element 310g to the client-computing device 300 as a separate file.

FIGS. 1-4D, the corresponding text, and the examples, provide a number of different methods, systems, and devices for managing message elements in electronic communication threads. In addition to the foregoing, embodiments can also be described in terms of flowcharts comprising acts and steps in a method for accomplishing a particular result. For example, FIGS. 5-6 may be performed with less or more steps/acts or the steps/acts may be performed in differing orders. Additionally, the steps/acts described herein may be repeated or performed in parallel with one another or in parallel with different instances of the same or similar steps/acts.

Figure 5:
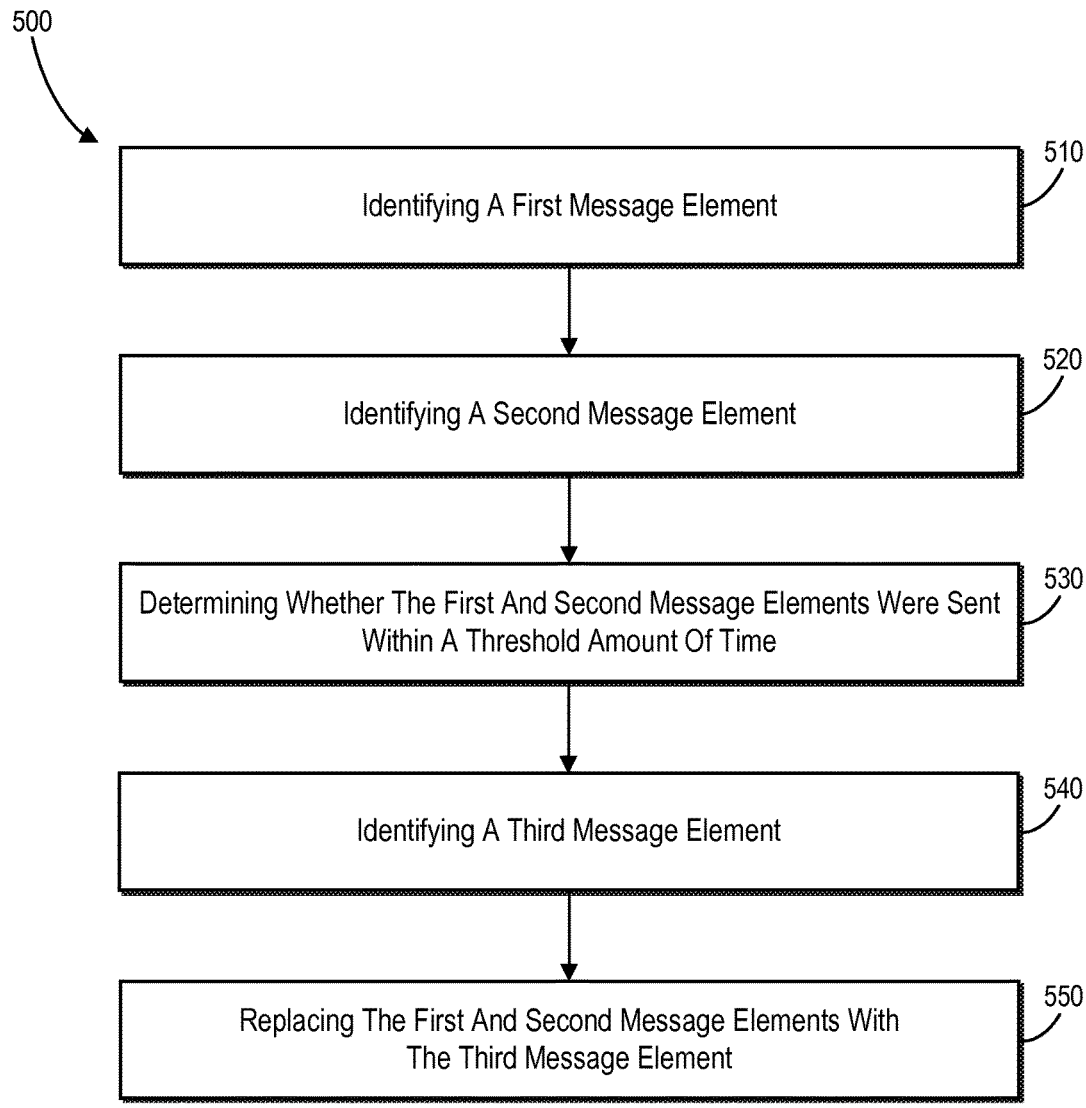
FIG. 5 illustrates a flowchart of a series of acts in a method of managing message elements in an electronic communication thread in accordance with one or more embodiments.

FIG. 5 illustrates a flowchart of one example method 500 of managing message elements in an electronic communication thread. The method 500 includes an act 510 of identifying a first message element. In particular, the act 510 can involve identifying a first message element (e.g., the message element 310a) submitted by a first user (e.g. the user 204a) in a communication thread (e.g., the communication thread 306). In at least one embodiment, upon opening a messaging application associated with the communication thread, the method 500 includes an acts of parsing at least a portion of the communications thread to identify any message elements included in the communications thread, identifying corresponding pairs of message elements sent within the threshold amount of time, replacing, in the communications thread, the corresponding pairs of message elements sent within the threshold amount of time with corresponding augmented message element, and rendering the message elements included in the communications thread.

Additionally, the method 500 includes an act 520 of identifying a second message element. In particular, the act 520 can involve identifying a second message element (e.g., the message element 310b) submitted by a second user (e.g., the user 204b) in the communication thread. In one or more embodiments, the first and/or the second message element can include a symbol, sticker, digital photograph, emoticon, video clip, audio clip, etc.

The method 500 also includes an act 530 of determining whether the message elements were submitted within a threshold amount of time. In particular, the act 530 can involve determining that the first message element and the second message element were submitted within a threshold amount of time. For example, in one or more embodiments, determining whether the first message element and the second message element were submitted within a threshold amount of time includes accessing metadata associated with the first message element to identify a submission time of the first message element, accessing metadata associated with the second message element to identify a submission time of the second message element, and comparing a difference between the submission time of the first message element and the submission time of the second message element to the threshold amount of time.

Further, the method 500 includes an act 540 of identifying a third message element. In particular, the act 540 can involve identifying, in response to the determination that the first message element and the second message element were submitted within the threshold amount of time, a third message element (e.g., the message element 310c) corresponding to the first message element and the second message element. In one or more embodiments, identifying a third message element corresponding to the first message element and the second message element includes accessing a table lookup and identifying from the look up table that a combination of the first message element and the second message element indicates the third message element without human intervention.

The method 500 also includes an act 550 of replacing the first and second message elements with the third message element. In particular, the act 550 can involve replacing, in the communication thread, the first message element and the second message element with the third message element. For example, replacing, in the communication thread, the first message element and the second message element with the third message element can include removing, from the communications thread, a first cell containing the first message element, removing, from the communications thread, a second cell containing the second message element, and providing a new cell in the communication thread containing the third message element without human intervention. In at least one embodiment, providing the new cell in the communication thread containing the third message element includes positioning the new cell in the communication thread in a position previously occupied by the first and second cells. In at least one embodiment, providing the new cell in the communication thread containing the third message element includes configuring a size of the new cell to correspond with a combined size of the first cell and the second cell. Additionally or alternatively, in at least one embodiment, replacing, in the communication thread, the first message element and the second message element with the third message element includes re-rendering the communications thread after positioning the new cell in the communication thread thereby removing the first message element and the second message element and rendering the third message element.

The method 500 can also include, after a predetermined period of time, removing, from the communications thread, the new cell containing the third message element, providing, in the communications thread, the first cell containing the first message element, providing, in the communications thread, the second cell containing the second message element, and re-rendering the communication thread thereby removing the third message element and rendering the first message element and the second message element. In one or more embodiments, the method further includes accessing metadata associated with the third message element to identify the predetermined period of time. In alternative embodiments, the predetermined period of time is based on user-configured settings.

Additionally or alternatively, the method 500 can include rendering the first message element in the communications thread upon receiving instructions via the mobile device to send the first message element to a client mobile device associated with the second user. Furthermore, the method 500 can include within the threshold amount of time, receiving a message sent from the client device that indicates the second message element has been sent from the second user, and rendering the second message element in the communications thread. In that case, the method 500 can also include re-rendering the communications thread after the first message element and the second message element are replaced in the communications thread with the third message element.

In one or more embodiments, the first message element comprises a first sticker, the second message element comprises a second sticker, and the third message element comprises a third sticker. For example, in one embodiment, the first sticker comprises a first illustration, the second sticker comprises a second illustration and the third sticker comprises an animation including the first illustration and the second illustration. Alternatively, in another embodiment, the first message element comprises a first image, the second message element comprises a second image, and the third message element comprises a collage including the first image and the second image. In yet another alternative embodiment, the first message element comprises a first illustration, the second message element comprises a second illustration, and the third message element comprises an animation.

Figure 6:
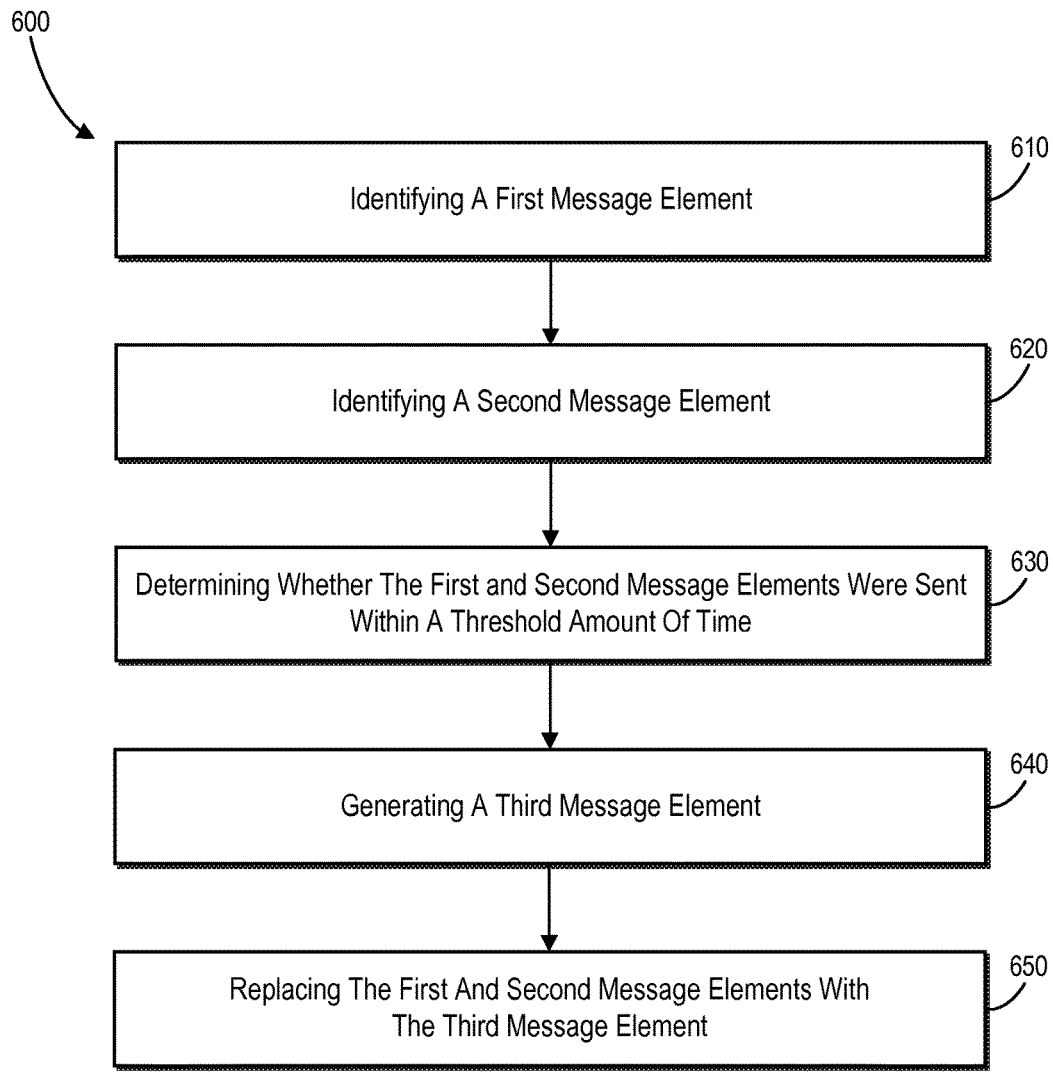
FIG. 6 illustrates a flowchart of a series of acts in a method of managing message elements in an electronic communication thread in accordance with one or more embodiments.

FIG. 6 illustrates a flowchart of one example method 600 of managing message elements in an electronic communication thread. The method 600 includes an act 610 of identifying a first message element. In particular, the act 610 can involve identifying, in a first user's communication thread (e.g., the communication thread 306), a first message element (e.g., the message element 310d) submitted by the first user (e.g., the user 204a).

Additionally, the method 600 includes an act 620 of identifying a second message element. In particular, the act 620 can involve identifying, in the first user's communication thread, a second message element (e.g., the message element 310e) submitted by a second user (e.g., the user 204b). In one or more embodiments, the first and/or the second message element can include a symbol, digital photograph, emoticon, video clip, audio clip, etc.

The method 600 also includes an act 630 of determining whether the message elements were submitted within a certain time frame. In particular, the act 630 can involve determining whether the first message element and the second message element were submitted within a threshold amount of time. For example, in one or more embodiments, determining whether the first message element and the second message element were submitted within a threshold amount of time comprises determining whether the date and time associated with the submission of the first message element and the date and time associated with the submission of the second message element are within a threshold amount of time. In one or more embodiments, the method 600 can further include an act of identifying submission information associated with the first message element and the second message element, wherein the submission information comprises information associated with the first, information associated with the second user, a date and time associated with the submission of the first message element, and a date and time associated with the submission of the second message element.

The method 600 can also include an act of identifying a type associated with the first message element and a type associated with the second message element without human intervention. In one or more embodiments, the type associated with the first message element and the type associated with the second message element is one of a digital photograph file, a digital video file, a digital audio file, a clip art file, or an image file. For example, identifying a type associated with the first message element a type associated with the second message element can be based on metadata associated with the first message element and the second message element.

Additionally, the method 600 includes an act 640 of generating a third message element. In particular, the act 640 can involve generating, based on the determination, a third message element (e.g., the message element 310g) comprising the first message element and the second message element. For example, generating a third message element comprising the first message element and the second message element can include performing a table lookup for a template based on the type associated with the first message element and the type associated with the second message element and generating the third message element by fitting the first message element and the second message element into the template without human intervention.

Furthermore, the method 600 includes an act 650 of replacing the first and second message elements with the third message element. In particular, the act 650 can involve replacing, in the communication thread, the first message element and the second message element with the third message element. For example, replacing, in the communication thread, the first message element and the second message element with the third message element can include re-rendering the communication thread to remove a cell associated with the first message element and a cell associated with the second message element and rendering a new cell in the communication thread containing the third message element. In one or more embodiments, rendering the new cell in the communication thread containing the third message element includes centering the third message element in the new cell without human intervention. Additionally, in at least one embodiment, the method 600 can include presenting an option to download the third message element without human intervention.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
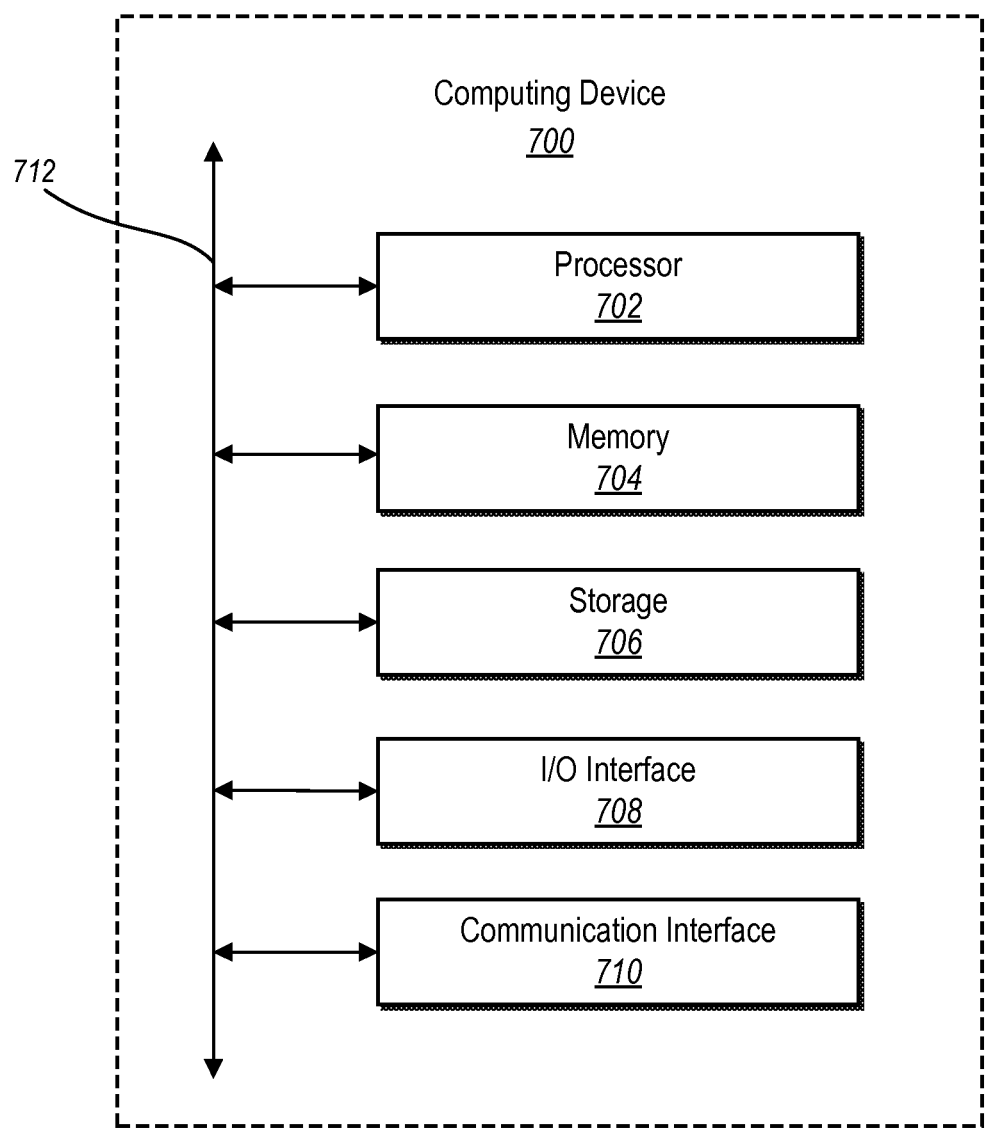
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication)

between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
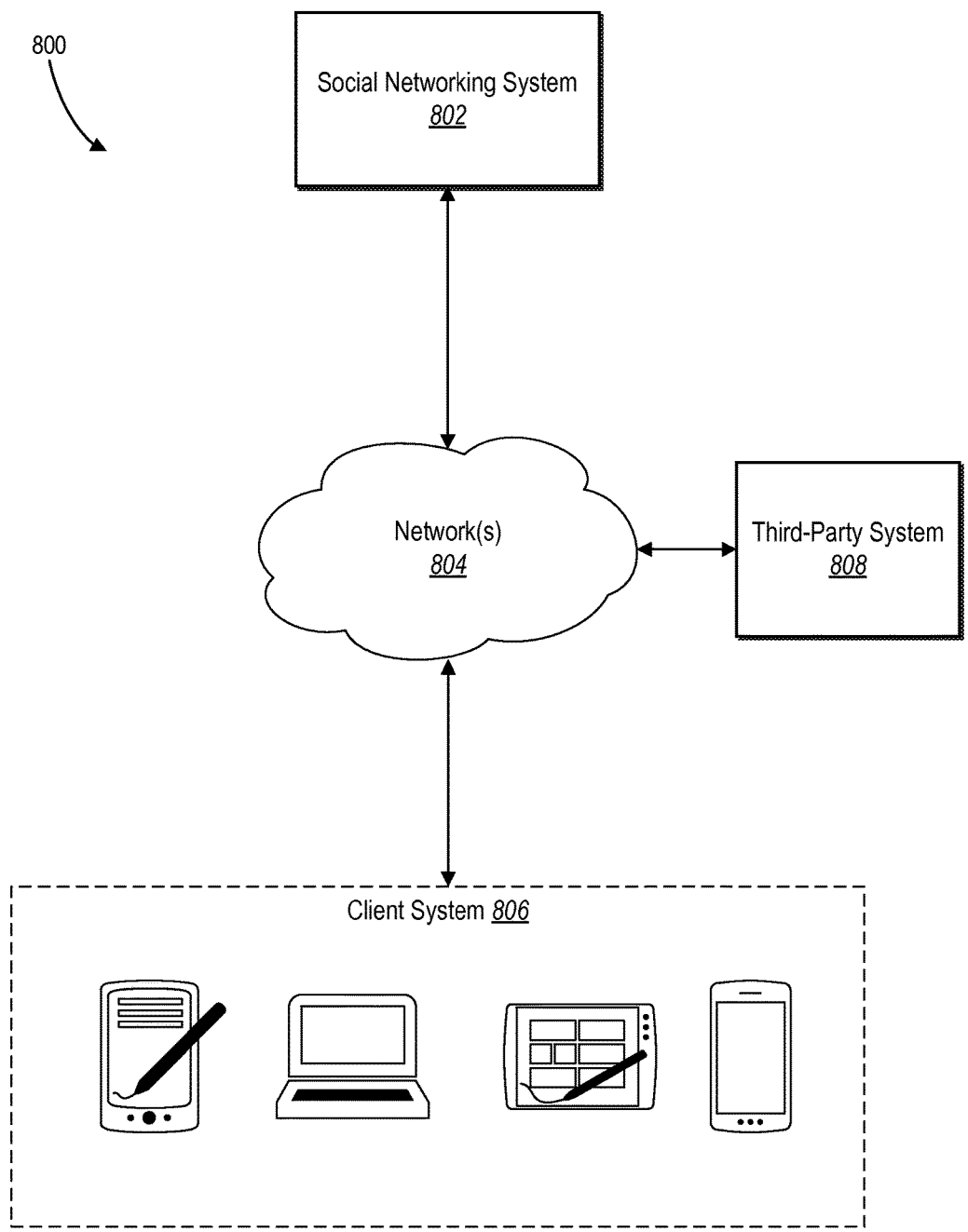
FIG. 8 is an example network environment of a social networking system in accordance with one or more embodiments.

FIG. 8 illustrates an example network environment 800 of a social networking system. Network environment 800 includes a client system 806, a social networking system 802, and a third-party system 808 connected to each other by a network 804. Although FIG. 8 illustrates a particular arrangement of client system 806, social networking system 802, third-party system 808, and network 804, this disclosure contemplates any suitable arrangement of client system 806, social networking system 802, third-party system 808, and network 804. As an example and not by way of limitation, two or more of client system 806, social networking system 802, and third-party system 808 may be connected to each other directly, bypassing network 804. As another example, two or more of client system 806, social networking system 802, and third-party system 808 may be physically or logically co-located with each other in whole or in part. Moreover, although FIG. 8 illustrates a particular number of client systems 806, social networking systems 802, third-party systems 808, and networks 804, this disclosure contemplates any suitable number of client systems 806, social networking systems 802, third-party systems 808, and networks 804. As an example and not by way of limitation, network environment 800 may include multiple client system 806, social networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like.

Herein, reference to a webpage encompasses one or more corresponding webpage files (which a browser may use to render the webpage) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social-networking system 802, or a third-party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third-party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social networking system 802. In particular embodiments, however, social networking system 802 and third-party systems 808 may operate in conjunction with each other to provide social-networking services to users of social networking system 802 or third-party systems 808. In this sense, social networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client system 806. Posts may include data such as status updates or other textual data, location information, photos, videos, links, music or other similar data or media. Content may also be added to social networking system 802 by a third-party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client systems 806 or one or more third-party system 808 via network 804. The web server may include a mail server or other messaging functionality for receiving and routing messages between social networking system 802 and one or more client systems 806. An API-request server may allow a third-party system 808 to access information from social networking system 802 by calling one or more APIs. An action logger may be used to receive communications from a web server about a user's actions on or off social networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
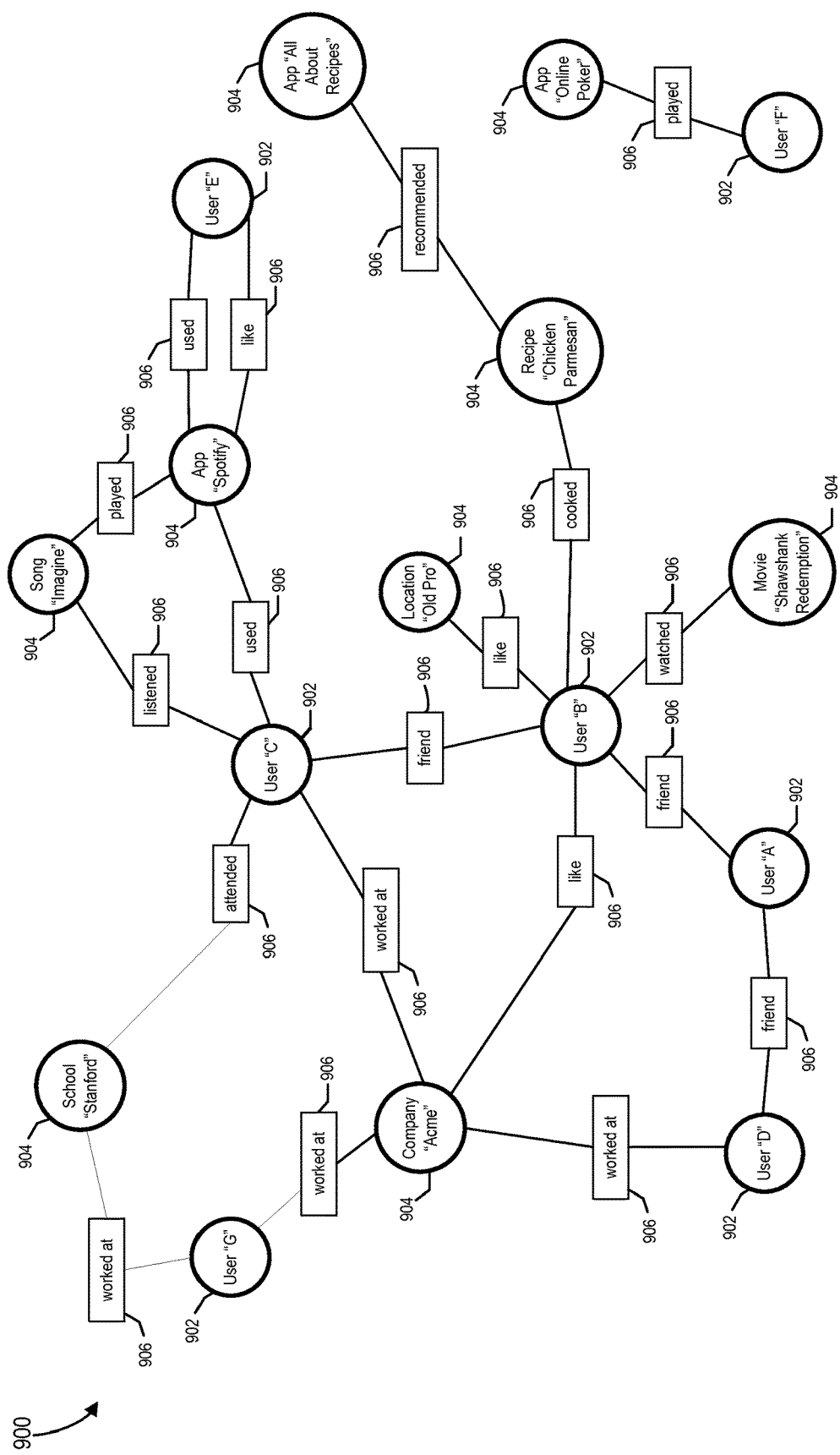
FIG. 9 illustrates a social graph in accordance with one or more embodiments.

FIG. 9 illustrates example social graph 900. In particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social networking system 802. Profile pages may also be hosted on third-party websites associated with a third-party server 908. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social networking system 802 a message indicating the user's action. In response to the message, social networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904.

In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   identifying a first message element associated with first metadata and submitted by a first user in a communication thread;
   identifying a second message element associated with second metadata and submitted by a second user in the communication thread;
   determining, by the one or more processors, that the first message element and the second message element were submitted within a threshold amount of time;
   identifying, in response to the determination that the first message element and the second message element were submitted within the threshold amount of time and based on the first metadata and the second metadata, a third message element corresponding to the first message element and the second message element;
   removing, from the communication thread, the first message element and the second message element and re-rendering the communication thread to include the third message element in place of the first message element and the second message element; and
   after a predetermined period of time, removing the third message element from the communication thread and re-rendering the communication thread to include the first message element and the second message element in place of the third message element.

2. The method as recited in claim 1, wherein identifying a third message element corresponding to the first message element and the second message element comprises accessing a table lookup and identifying from the look up table that a combination of the first message element and the second message element indicates the third message element.

3. The method as recited in claim 1, wherein removing, from the communication thread, the first message element and the second message element and re-rendering the communication thread to include the third message element in place of the first message element and the second message element comprises:
   removing, from the communication thread, a first cell containing the first message element;
   removing, from the communication thread, a second cell containing the second message element; and
   providing a new cell in the communication thread containing the third message element.

4. The method as recited in claim 3, wherein providing the new cell in the communication thread containing the third message element comprises positioning the new cell in the communication thread in a position previously occupied by the first and second cells.

5. The method as recited in claim 4, wherein removing, from the communication thread, the first message element and the second message element and re-rendering the communication thread to include the third message element comprises re-rendering the communication thread after positioning the new cell in the communication thread thereby removing the first message element and the second message element and rendering the third message element.

6. The method as recited in claim 5, wherein, after the predetermined period of time, removing the third message element from the communication thread and re-rendering the communication thread to include the first message element and the second message element in place of the third message element comprises:
   removing, from the communication thread, the new cell containing the third message element;
   providing, in the communication thread, the first cell containing the first message element;
   providing, in the communication thread, the second cell containing the second message element; and
   re-rendering the communication thread thereby removing the third message element and rendering the first message element and the second message element.

7. The method as recited in claim 6, further comprising accessing third metadata associated with the third message element to identify the predetermined period of time.

8. The method as recited in claim 1, wherein:
   the first message element comprises a first sticker;
   the second message element comprises a second sticker; and
   the third message element comprises a third sticker.

9. The method as recited in claim 8, wherein:
   the first sticker comprises a first illustration;
   the second sticker comprises a second illustration; and
   the third sticker comprises an animation including the first illustration and the second illustration.

10. The method as recited in claim 1, wherein:
    the first message element comprises a first image;
    the second message element comprises a second image; and
    the third message element comprises a collage including the first image and the second image.

11. The method as recited in claim 1, wherein determining that the first message element and the second message element were submitted within the threshold amount of time comprises:
    accessing the first metadata associated with the first message element to identify a submission time of the first message element;
    accessing the second metadata associated with the second message element to identify a submission time of the second message element; and
    comparing a difference between the submission time of the first message element and the submission time of the second message element to the threshold amount of time.

12. A mobile device comprising:
at least one processor; and
at least one non-transitory computer-readable storage medium storing instructions thereon that, when executed by the at least one processor, cause the mobile device to:
identify a first message element associated with first metadata and submitted by the first user in a communication thread;
identify a second message element associated with second metadata and submitted by a second user in the communication thread;
determine that the first message element and the second message element were submitted within a threshold amount of time;
identify, in response to determining that the first message element and the second message element were submitted within the threshold amount of time and based on the first metadata and the second metadata, a third message element corresponding to the first message element and the second message element;
remove, from the communication thread, the first message element and the second message element and re-render the communication thread to include the third message element in place of the first message element and the second message element; and
after a predetermined period of time, remove the third message element from the communication thread and re-render the communication thread to include the first message element and the second message element in place of the third message element.

13. The mobile device as recited in claim 12, wherein:
the first message element comprises a first illustration;
the second message element comprises a second illustration; and
the third message element comprises an animation.

14. The mobile device as recited in claim 12, further comprising instructions, that when executed by the at least one processor, cause the mobile device, upon opening of a messaging application associated with the communication thread, to:
parse at least a portion of the communication thread to identify any message elements included in the communication thread;
identify corresponding pairs of message elements sent within the threshold amount of time;
remove, from the communication thread, the corresponding pairs of message elements sent within the threshold amount of time and replace the corresponding pairs of message elements with a corresponding augmented message element in a same position as the corresponding pair of message elements; and
render the corresponding augmented message element in addition to the remaining message elements included in the communication thread.

15. The mobile device as recited in claim 12, further comprising instructions, that when executed by the at least one processor, cause the mobile device to:
access the first metadata associated with the first message element to identify a submission time of the first message element;
access the second metadata associated with the second message element to identify a submission time of the second message element; and
compare a difference between the submission time of the first message element and the submission time of the second message element to the threshold amount of time.

16. The mobile device as recited in claim 12, wherein the instructions that cause the mobile device to, after the predetermined period of time, remove the third message element from the communication thread and re-render the communication thread to include the first message element and the second message element in place of the third message element, further cause the mobile device to:
remove, from the communication thread, a first cell containing the first message element;
remove, from the communication thread, a second cell containing the second message element;
provide a new cell in the communication thread containing the third message element; and
re-rendering the communication thread after the new cell is provided in the communication thread thereby removing the first message element and the second message element and rendering the third message element.

17. The mobile device as recited in claim 16, wherein the instructions that cause the mobile device to provide the new cell in the communication thread containing the third message element further cause the mobile device to configure a size of the new cell to correspond with a combined size of the first cell and the second cell.

18. The mobile device as recited in claim 12, further comprising instructions, that when executed by the at least one processor, cause the mobile device to:
render the first message element in the communication thread upon receiving instructions via the mobile device to send the first message element to a client mobile device associated with the second user;
within the threshold amount of time, receive a message sent from the client device that indicates the second message element has been sent from the second user;
render the second message element in the communication thread; and
re-render the communication thread after the first message element and the second message element are removed from the communication thread such that the communication thread includes the third message element in a position previously occupied by the first message element and the second message element.

19. A non-transitory computer readable medium storing instructions thereon that, when executed by at least one processor, cause the at least one processor to:
identify a first message element associated with first metadata and submitted by the first user in a communication thread;
identify a second message element associated with second metadata and submitted by a second user in the communication thread;
determine that the first message element and the second message element were submitted within a threshold amount of time;
identify, in response to the determination that the first message element and the second message element were submitted within the threshold amount of time and based on the first metadata and the second metadata, a third message element corresponding to the first message element and the second message element;
remove, from the communication thread, the first message element and the second message element and re-render the communication thread to include the third message element in place of the first message element and the second message element; and after a predetermined period of time, remove the third message element from the communication thread and re-render the communication thread to include the first message element and the second message element in place of the third message element.

20. The non-transitory computer readable medium as recited in claim 19, further comprising instructions that, when executed by at least one processor, cause the at least one processor to:

identify a fourth message element in the communication thread;

determine that the fourth message element, the second message element, and the first message element were submitted within a second threshold amount of time;

identify, in response to the determination that the fourth message element, the second message element, and the first message element were submitted within a second threshold amount of time, a fifth message element corresponding to the first message element, the second message element, and the fourth message element; and remove, from the communication thread, the first message element, the second message element, and the fourth message element and re-render the communication thread to include the fifth message element in place of the first message element, the second message element, and the fourth message element.

* * * * *